United States Patent
Shimizu

(10) Patent No.: US 7,593,590 B2
(45) Date of Patent: Sep. 22, 2009

(54) IMAGE STATUS ESTIMATING METHOD, IMAGE CORRECTING METHOD, IMAGE CORRECTION APPARATUS, AND STORAGE MEDIUM

(75) Inventor: Masayoshi Shimizu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 435 days.

(21) Appl. No.: 09/957,032

(22) Filed: Sep. 21, 2001

(65) Prior Publication Data

US 2002/0118889 A1 Aug. 29, 2002

(30) Foreign Application Priority Data

Dec. 28, 2000 (JP) ............... 2000-401757

(51) Int. Cl.
G06K 9/40 (2006.01)
G06K 9/38 (2006.01)

(52) U.S. Cl. ...................... 382/274; 382/270

(58) Field of Classification Search ............... 382/164, 382/165, 167, 228, 168–172, 270–276
See application file for complete search history.

(56) References Cited

U.S. PATENT DOCUMENTS

| | | | | |
|---|---|---|---|---|
| 5,539,523 A | * | 7/1996 | Nakai et al. | 358/296 |
| 5,581,370 A | * | 12/1996 | Fuss et al. | 358/447 |
| 5,748,802 A | * | 5/1998 | Winkelman | 382/271 |
| 6,631,208 B1 | * | 10/2003 | Kinjo et al. | 382/167 |
| 6,738,527 B2 | | 5/2004 | Kuwata et al. | |
| 6,919,924 B1 | | 7/2005 | Terashita | |

FOREIGN PATENT DOCUMENTS

| | | |
|---|---|---|
| JP | A-6-98173 | 4/1994 |
| JP | 6-215128 | 8/1994 |
| JP | 8-329241 | 12/1996 |
| JP | A-10-150566 | 6/1998 |
| JP | 11-8768 | 1/1999 |
| JP | 11-331596 | 11/1999 |

OTHER PUBLICATIONS

Kobayashi, et al., "A Method of Tone Correction for PDP", Proc. Of Color Forum, Japan '99, 1999, pp. 17-20 with English translation.
Katajamaki, et al., "Image Dependent Gamma Selection Based on Color Palette Equalization and a Simple Lightness Model", Proc. Of $7^{th}$ CIC, 1999, pp. 301-306.

(Continued)

Primary Examiner—Wesley Tucker
(74) Attorney, Agent, or Firm—Staas & Halsey LLP

(57) ABSTRACT

An apparatus divides an original image into a plurality of areas, computes a characteristic amount for the plurality of areas, and computes a statistic amount for estimation of the status of an image using the characteristic amount. The statistic amount is compared with a predetermined value, a correcting parameter for correcting an image is determined based on the comparison result, and the original image is corrected using the correcting parameter. Thus, appropriate corrections can be made to images of various types and statuses.

9 Claims, 20 Drawing Sheets

OTHER PUBLICATIONS

Takeshi Agui et al., "Process and Recognition of Image", Published by Shokodo, pp. 128-139.

C. D. Watkins et al., "Modern Image Processing" Warping, Morphing and Classical Techniques, Academic Press Inc., pp. 64-67.

R. W. G. Hunt, "Measuring Color, Third Edition", Published by Fountain Press, pp. 63-65 and 191-199.

Office Action mailed on Mar. 18, 2008 and issued in corresponding Japanese Patent Application No. 2000-401757.

* cited by examiner

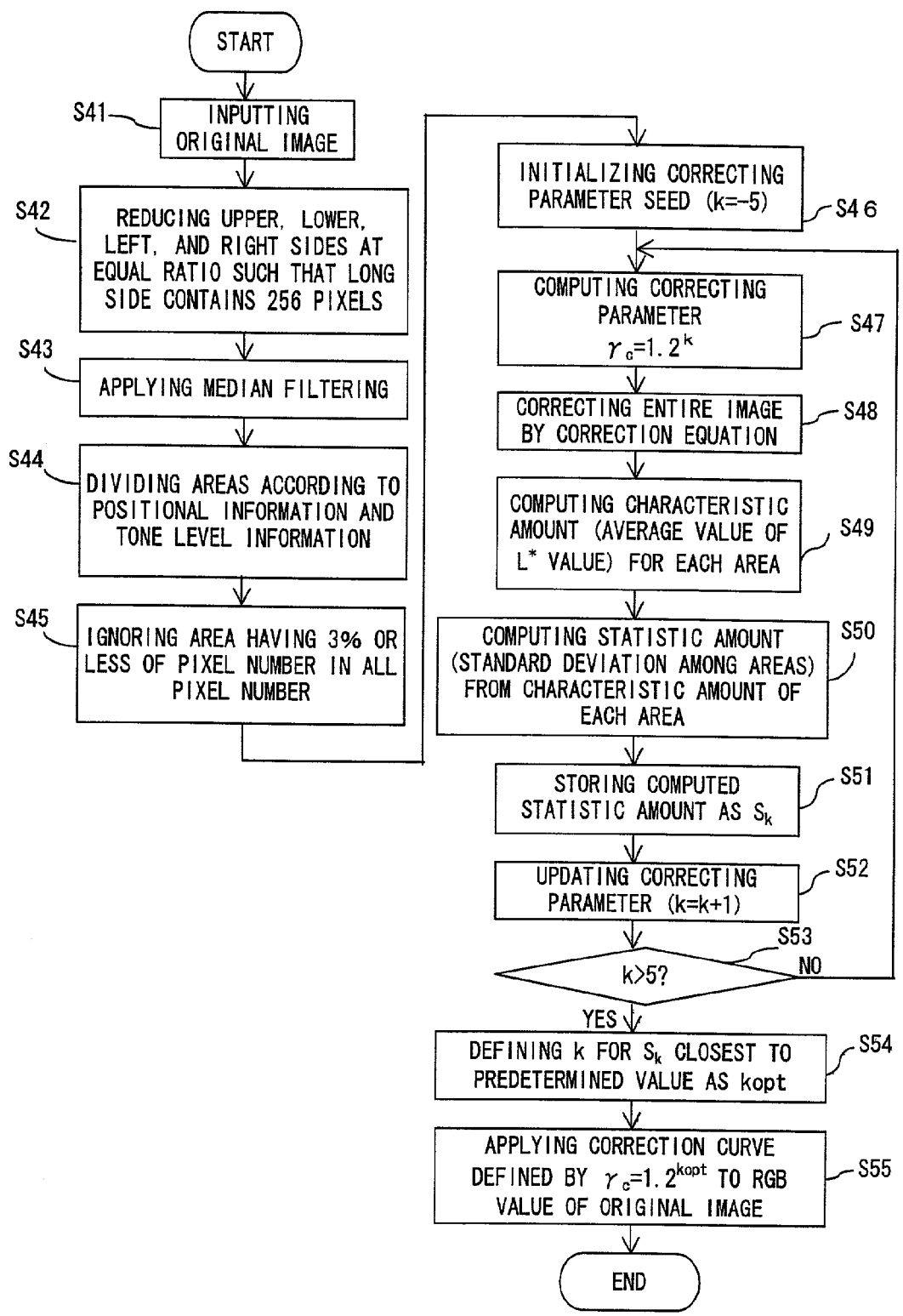
F I G. 1 0

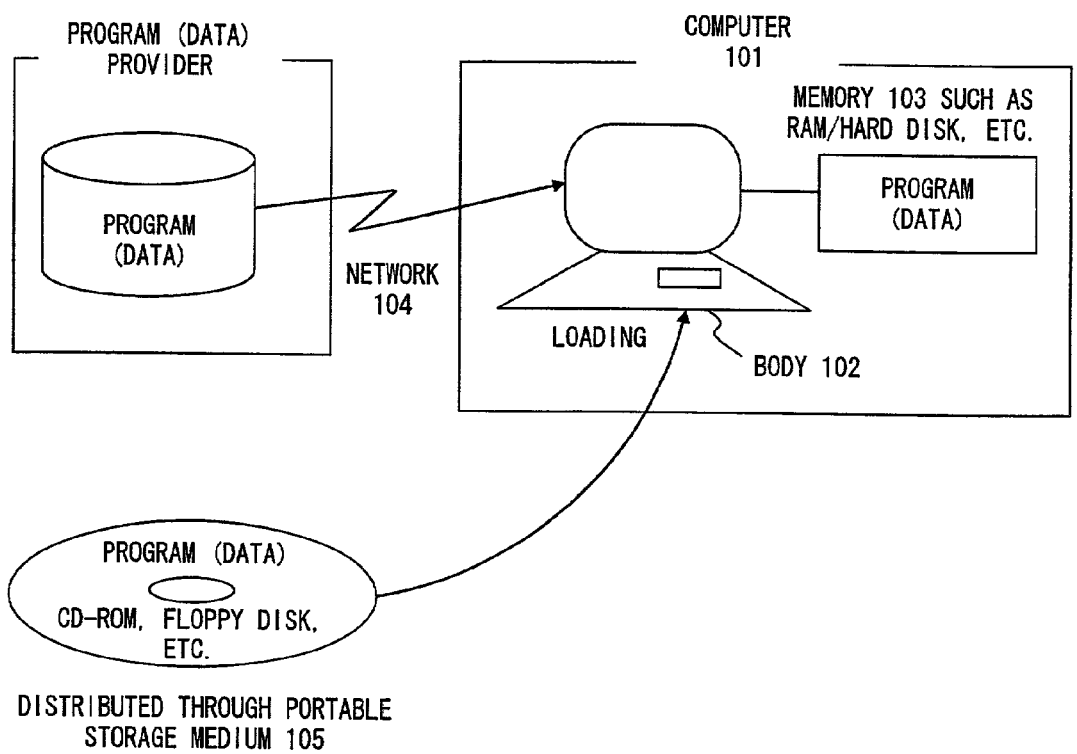
F I G. 20

IMAGE STATUS ESTIMATING METHOD, IMAGE CORRECTING METHOD, IMAGE CORRECTION APPARATUS, AND STORAGE MEDIUM

BACKGROUND OF THE INVENTION

1. Field of the Invention

The present invention relates to the; and technology of correcting an image, and more specifically to an image status estimating method, an image correcting method, and an image correction apparatus for obtaining a characteristic amount of a plurality of areas forming an image, estimating the status of the image by obtaining the statistic amount for estimation of the status of the image based on the characteristic amount, and correcting the image based on the estimation result. The present invention can be applied to all fields of industries processing images such as an image relevant appliance industry of a digital camera, a color printer, etc.

2. Description of the Related Art

With the spread of image relevant appliances such as a digital camera, a color printer, etc. and the improvement of the performance of computers, there have been an increasing number of machines which can be operated by general consumers to process digital color images. However, the quality of a color image captured by a digital camera, etc. does not always satisfy a user.

For example, some images are too dark and insufficient in contrast. Therefore, the technology of improving the quality of an original image to easily obtain a satisfactory image, that is, the technology of correcting an image, is required.

There have been the following four typical conventional methods for correcting an image.

The first method is to correct the bias of the histogram depending on the form of the histogram of the intensity of an image, and to correct the tone level of the image such that the histogram can be smoothly formed as described in the following documents.

Document 1) Kobayashi, et al. 'A method of tone correction for PDP' from Color Forum Japan '99, p 17-20 (1999)

FIG. 1 is a flowchart of the process in the first method. In FIG. 1, the apparatus for performing an image process obtains the distribution of the tone level for each pixel of an image in step S101, places restrictions in step S102 when the distribution shows an exceeding bias, generates a correction curve based on the restricted distribution data in step S103, and corrects the tone level in step S104. The correction curve can be a curve based on an exponential function, and the tone level is corrected with an excess correction avoided.

The second method is to compute the intensity for each small area after dividing an image into a plurality of small areas in a lattice form. The brightness of the image is corrected according to the computed intensity information. This method is described in the following document.

Document 2) Akira Inoue 'Brightness Correction Apparatus' (Japanese Patent Application No. 150566 of 1998.

FIG. 2 is a flowchart of the process in the second method. In FIG. 2, an image processing device first divides an image into a plurality of predetermined small areas, that is, into small areas in a lattice form, in step S106, and then computes an average value in brightness for each small area in step S107. In step S108, it obtains a value by dividing a sum of the maximum and minimum values of the intensity average values by 2, and corrects the tone level based on the computation result in step S109. As a correction curve, an exponential function is used as in the first method.

In the third method, an image is divided into a plurality of areas based on the distribution of the colors of the image. The correction is made such that the distribution of the brightness can be appropriately obtained for each area. This method is described in the following document.

Document 3) Juha Katajamaki and Pekka Laihanen, 'Image Dependent Gamma Selection Based on Color Palette Equalization and Simple Lightness Model', Proc. of 7th CIC, 301-306 (1999).

FIG. 3 is a flowchart of the process of the third method. In this method, an image processing device first divides an image into a plurality of areas according to color information in step S111, and computes an average value of the brightness for each area in step S112. In step S113, the image is corrected using a correction curve based on an exponential function such that the average value of the brightness can be evenly distributed. In dividing an image into areas, clustering technology is used after mapping each pixel of an original image into color space points as feature space.

In the fourth method, for example, an image is divided into 16×16 small areas in a predetermined dividing method independent of the contents of the image, an importance level of an area is determined based on the characteristic amount of, for example, standard deviation, etc. for each of the small divided areas, and the image is corrected based on the histogram of only important areas. This method is described in the following document.

Document 4) Kurt Helfriedwinkelman 'Method and Apparatus for Analyzing and Correcting Image Gradation of Original Image' Japanese Patent Application No. 98173 of 1994.

FIG. 4 is a flowchart of the process in the fourth method. In FIG. 4, an image processing device first divides the entire image into predetermined small areas in step S116, computes the importance level for each of the small areas in step S117, and determines a tone level correction curve with only important areas taken into account based on the important level in step S118, thereby correcting the image.

As described above, some methods have been suggested to correct an image. However, these conventional methods have the following problems.

In the first method, the process is performed based on the histogram of the intensity of a pixel. Therefore, with an image in which the tone levels are concentrated on lower levels, there is the problem that a correction amount largely depends on the tone levels at lower levels. Although the problem is to be solved by suppressing a large correction in the above mentioned document, there is still the problem that an appropriate correction cannot be made to an image actually requiring a large correction.

In the second method, an average value of the intensity is obtained for each of the divided small areas, and a correction amount is determined based on the intermediate value between the maximum and minimum values of the average values. Then, as in the first method, the problem occurring when values concentrate on a specific tone level can be avoided. However, the level between the maximum and minimum values is not considered at all, and there also occurs the problem that an appropriate correction cannot be made to an image where an intermediate tone level has not been appropriately obtained.

In the third method, a process is performed after dividing an image into a plurality of areas based on the distribution of color. Therefore, the problem occurring when there is a strong bias toward a specific tone level can be solved to a certain extent.

For example, when most part of an image, for example a night view, is dark, the image is likely to be determined to be too dark entirely in the first method. However, in the third method, the dark portion of the image is processed as one area, and other bright colors are separately processed as individual areas. Therefore, it is rare that the entire image is too dark.

However, since each area is evaluated based on the same weight in this method, a problem can occur. To be practical, since a very small area can be evaluated as an area, a small area can be overestimated in the other way of the first method. For example, if there are a number of small lights in the distance in a night view, it can be determined that there are a number of bright areas, and it is mistakenly determined that the image is bright in most part of it.

In the fourth method, since an image is divided into a plurality of areas in a predetermined method, a division result is independent of the taste or a recognition result of a person about the image. There is no problem when the boundary of divided areas accidentally matches the boundary between an area which a user considers important and an area which he or she considers unimportant. However, the boundaries do not necessarily match each other. Half the generated areas can be considered important, and the other half can be considered unimportant. That is, there is a problem that an image can be inappropriately divided to perform a desired process for the feeling of a user.

As described above, according to the conventional technology, there has been the problem that an image cannot be appropriately corrected when there is a large area having a specific tone level, when the brightness of an area having an intermediate tone level is not appropriate, or when there are a number of small objects. Furthermore, there is the problem that an image cannot be correctly corrected when the boundary of divided areas in a predetermined method does not match the boundary corresponding to the feeling in importance of a user.

SUMMARY OF THE INVENTION

The present invention aims at solving the above mentioned problems and providing an image status estimating method, an image correcting method, and an image correction apparatus capable of suitable estimating an appropriate image status for various images and suitable correcting the images by dividing an image into areas according to, for example, tone level information, obtaining a weight and a characteristic amount for each area, computing a statistic amount indicating the status of the image using the weight and the characteristic amount, estimating the status of the image based on the statistic amount, and correcting the image.

In the image status estimating method for estimating the status of an image, an image is divided into a plurality of areas, a characteristic amount is computed for each of the plurality of areas, and a statistic amount is computed to estimate the status of an image using the characteristic amount.

In the image correcting method for correcting an original image, the original image is divided into a plurality of areas, a characteristic amount is computed for each of the plurality of areas, a statistic amount indicating the status of the original image is computed using the characteristic amount, the computed statistic amount is compared with a predetermined value, an image correcting parameter is determined based on the comparison result, and the original image is corrected using the image correcting parameter.

Additionally, in another aspect of the image correcting method, a plurality of corrected images are generated by correcting an original image using a plurality of different correcting parameters, each of the plurality of corrected images is divided into a plurality of areas, a characteristic amount of each of the plurality of areas is computed for the plurality of corrected images, a statistic amount indicating the status of the corrected image is computed for the plurality of corrected images using the characteristic amount, and a corrected image obtained by performing a correcting process using a correcting parameter corresponding to a statistic amount close to a predetermined value in the computed statistic amounts is defined as an appropriate corrected image.

The image correction apparatus for correcting an original image according to the first embodiment of the present invention includes: an area division unit, a characteristic amount computation unit, a statistic amount computation unit, a correcting parameter setting unit, and an image correction unit.

The area division unit divides an original image into a plurality of areas.

The characteristic amount computation unit computes a characteristic amount for each of the plurality of areas.

The statistic amount computation unit computes a statistic amount indicating the state of an image using the characteristic amount.

The correcting parameter setting unit compares the computed statistic amount with a predetermined value, and determines a correcting parameter based on the comparison result.

The image correction unit corrects an original image using the correcting parameter.

The image correction apparatus for correcting an original image according to the second embodiment of the present invention includes a first image correction unit, an area division unit, a characteristic amount computation unit, a statistic amount computation unit, and a second image correction unit.

The first image correction unit generates a plurality of corrected images by correcting the original image using a plurality of correcting parameters.

The area division unit divides each of the plurality of corrected images into a plurality of areas.

The characteristic amount computation unit computes a characteristic amount for each of the plurality of areas.

The statistic amount computation unit computes the statistic amount indicating the status of an image using the characteristic amount.

The second image correction unit defines as a correction result a corrected image by the above mentioned correcting parameter corresponding to the statistic amount closest to a predetermined value in a plurality of computed statistic amounts.

According to the present invention, the status of an image can be appropriately estimated for various images, and a desired correction can be made to an original image using the estimate result.

BRIEF DESCRIPTION OF THE DRAWINGS

FIG. 10 is a flowchart of the image correcting process according to the second embodiment of the present invention;

FIG. 20 shows an example of the configuration of a computer system.

DESCRIPTION OF THE PREFERRED EMBODIMENT

Figure 5:
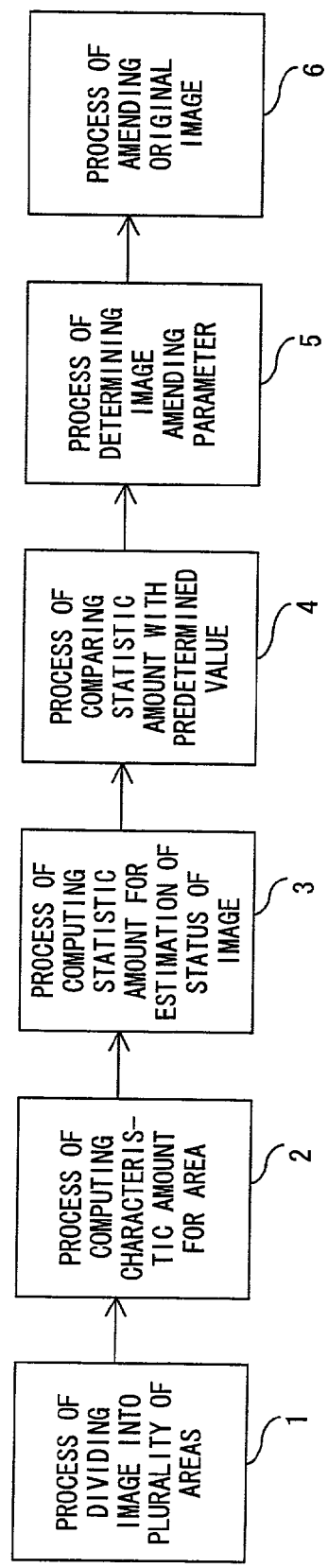
FIG. 5 is a block diagram showing the function of the process performed by the image correcting method according to the present invention.

FIG. 5 is a block diagram of the function of the process according to the present invention. FIG. 5 is a block diagram of the function of the image status estimating method for estimating the status of an image, and the image correcting method for correcting an original image.

In the image status estimating method according to the present invention, an image is divided into a plurality of areas in the process 1 shown in FIG. 5 according to the tone level information about a pixel forming part of the image, or according to both tone level information and positional information. Then, in the process 2, a characteristic amount is computed for each of the plurality of divided areas.

In computing the characteristic amount, the tone level of a pixel forming part of an image can be converted into a brightness value to use the conversion result, or the tone level can be converted into a chroma value to use the conversion result. Furthermore, characteristic amounts corresponding to a pixel forming part of an image can be averaged to use the average value.

In the process 3 shown in FIG. 5, the status of an image can be estimated as to whether the image is bright or dark by computing the statistic amount for estimation of the status of the image. In computing the statistic amount, a weight coefficient can be used for each area in addition to the characteristic amount of each area. In this case, as a statistic amount, the weight coefficient for each area can be added as a weight, and a weighted average value between the areas having the above mentioned characteristic amounts can be computed. Furthermore, a weight coefficient is added as a weight for each area, and the weighted standard deviation of the characteristic amount can be computed.

When a statistic amount is computed, the weight coefficient for each area used in addition to the characteristic amount for each area can also be determined corresponding to the number of pixels forming an image of each area, and can be determined corresponding to the position of an area in the image. For example, an area closer to the center of the image can have a larger weight coefficient for the area. Furthermore, when the number of pixels forming an area is smaller than a predetermined threshold, the weight coefficient of the area can be set to 0.

Figure 1:
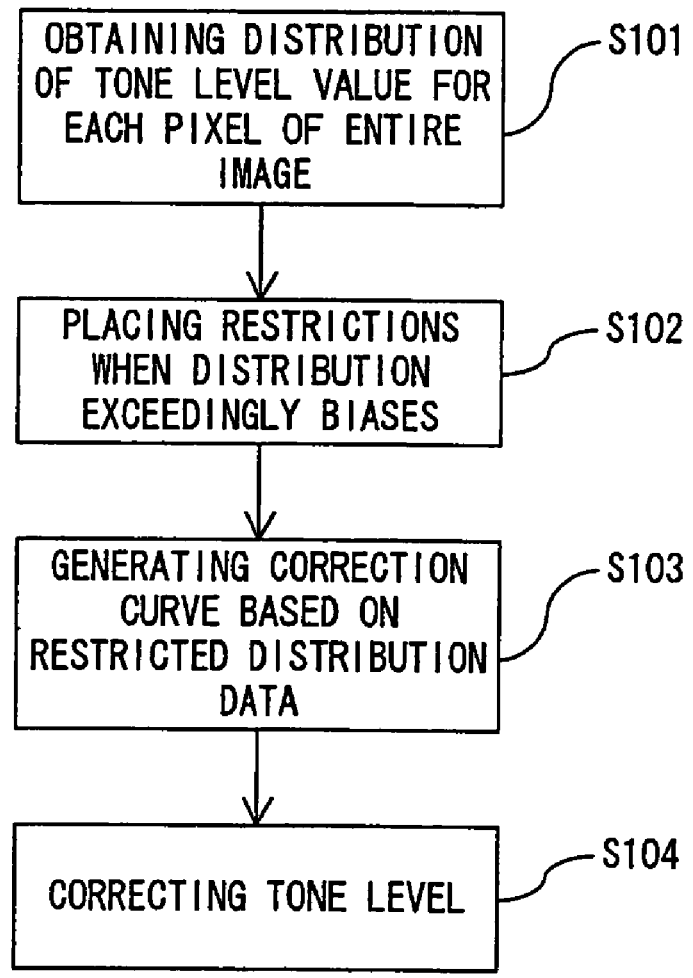
FIG. 1 is a flowchart of the process according to the first conventional method of correcting an image.
Figure 2:
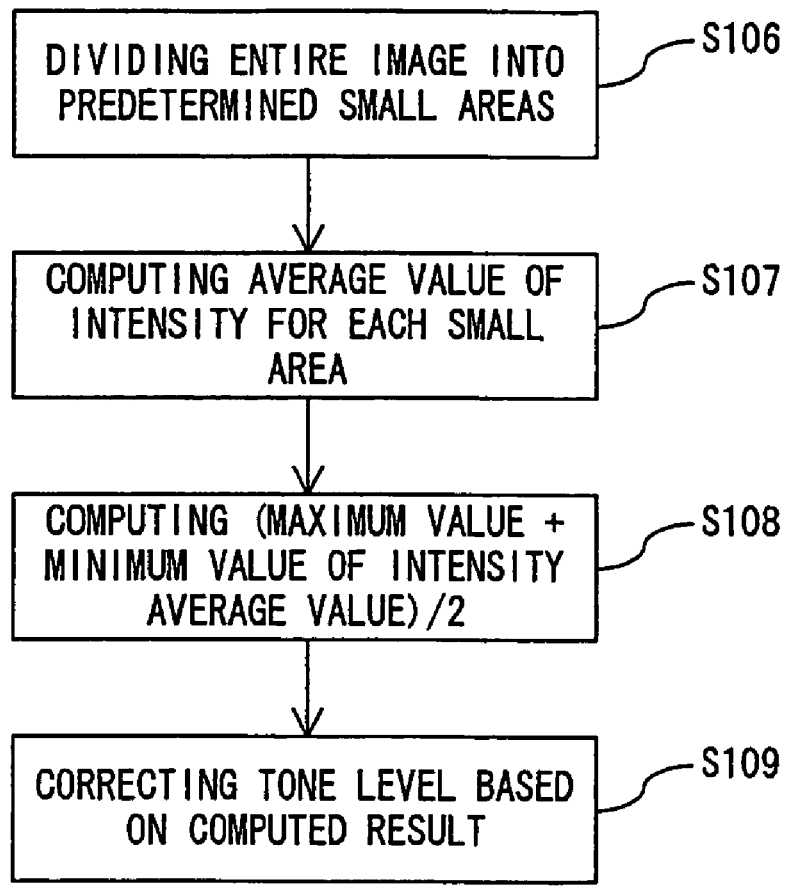
FIG. 2 is a flowchart of the process according to the second conventional method of correcting an image.
Figure 3:
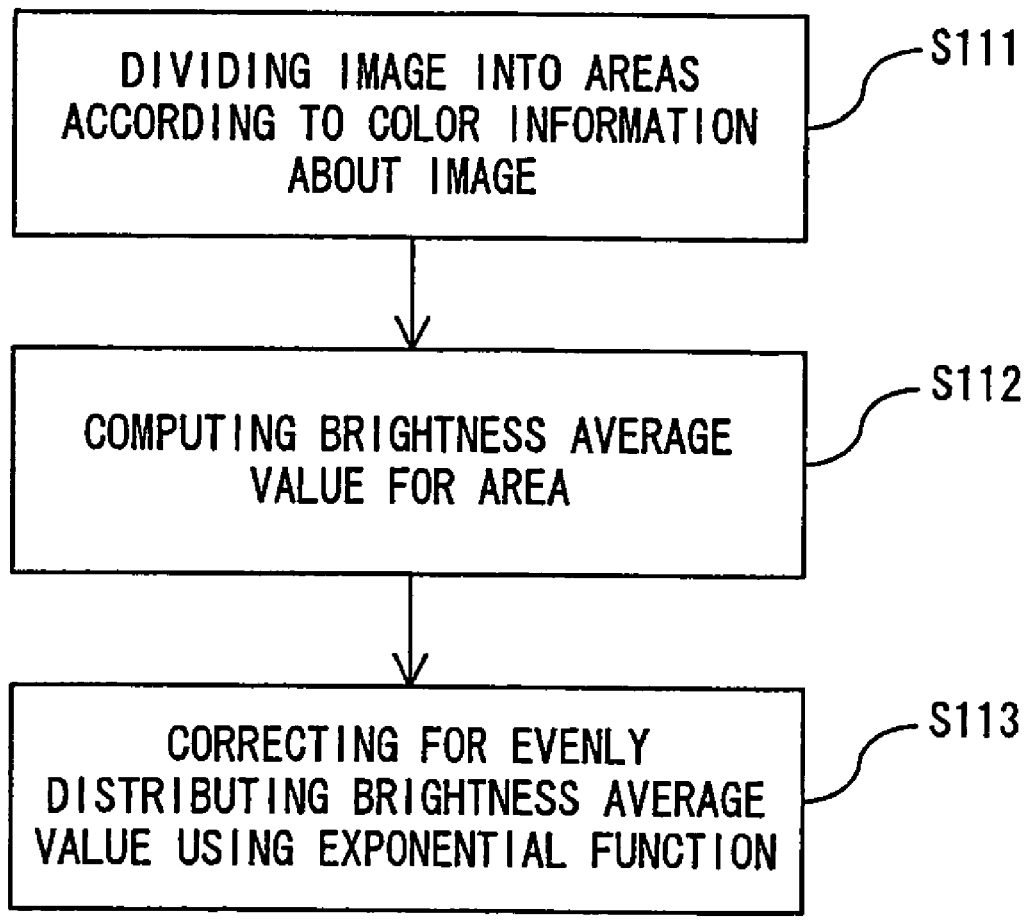
FIG. 3 is a flowchart of the process according to the third conventional method of correcting an image.
Figure 4:
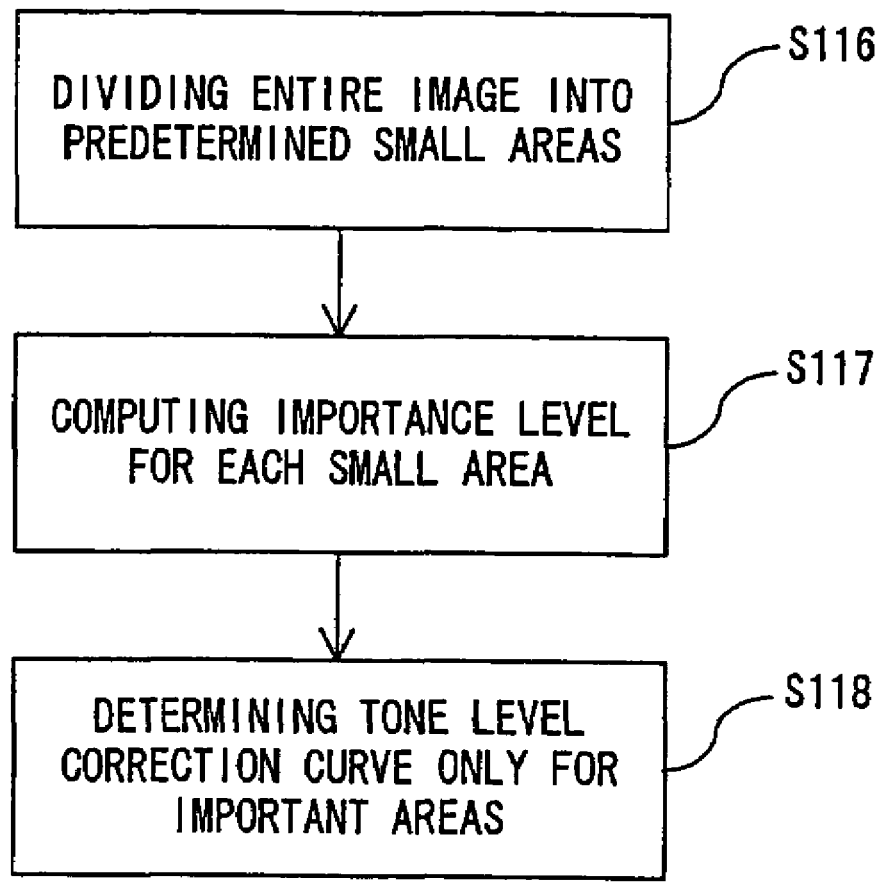
FIG. 4 is a flowchart of the process according to the fourth conventional method of correcting an image.

A computer-readable portable storage medium used in a computer for estimating the status of an image is used as a storage medium for storing a program used to direct the computer to perform the steps corresponding to the processes 1 through 3 shown in FIG. 1.

In the image correcting method according to the present invention, an original image is divided into a plurality of areas in the process 1 shown in FIG. 5, the characteristic amount for each of the plurality of areas is computed in the process 2, and the statistic amount indicating the status of the original image is computed using the characteristic amount computed in the process 3. Then, in the process 4, the computed statistic amount is compared with a predetermined value, and an image correcting parameter is determined based on the comparison result in the process 5. In the process 6, the original image is corrected.

An image correction apparatus can be configured in this image correcting method. In addition, the present invention can be realized as a computer-readable portable storage medium storing a program used, by a computer for correcting an image, to direct a computer to perform the above mentioned method.

As the image correcting method according to the present embodiment, an original image is corrected using some different correcting parameters, a plurality of corrected images are generated, the plurality of corrected images are divided into a plurality of areas, a characteristic amount of each of the plurality of areas is computed for the plurality of corrected images, a statistic amount indicating the status of a corrected image is computed for a plurality of corrected images using the characteristic amount, and a corrected image corrected using a correcting parameter corresponding to the statistic amount close to a predetermined value in the computed statistic amounts is used as an appropriate corrected image.

This method can be configured as a computer-readable portable storage medium storing a program used to direct a computer for correcting an image.

Furthermore, in the image correcting method according to the present embodiment, a corrected image for an original image is generated using any correcting parameter, the corrected image is divided into a plurality of areas, a characteristic amount is computed for each of the plurality of areas, a statistic amount indicating the status of a corrected image is computed using the characteristic amount, the corrected image is defined as an appropriate corrected image when the computed is close to a predetermined value, a corrected image is generated by changing the correcting parameter when the computed statistic amount is largely different from the predetermined value, and the process and after the process of dividing the corrected image into a plurality of areas is repeated.

As described above, according to the present invention, for example, an image is divided into a plurality of areas according to the tone level information, a characteristic amount is computed for each of the plurality of areas, a statistic amount for estimation of the status of an image is computed using the characteristic amount and a weight coefficient for each area, and the image is corrected corresponding to the statistic amount.

Figure 6:
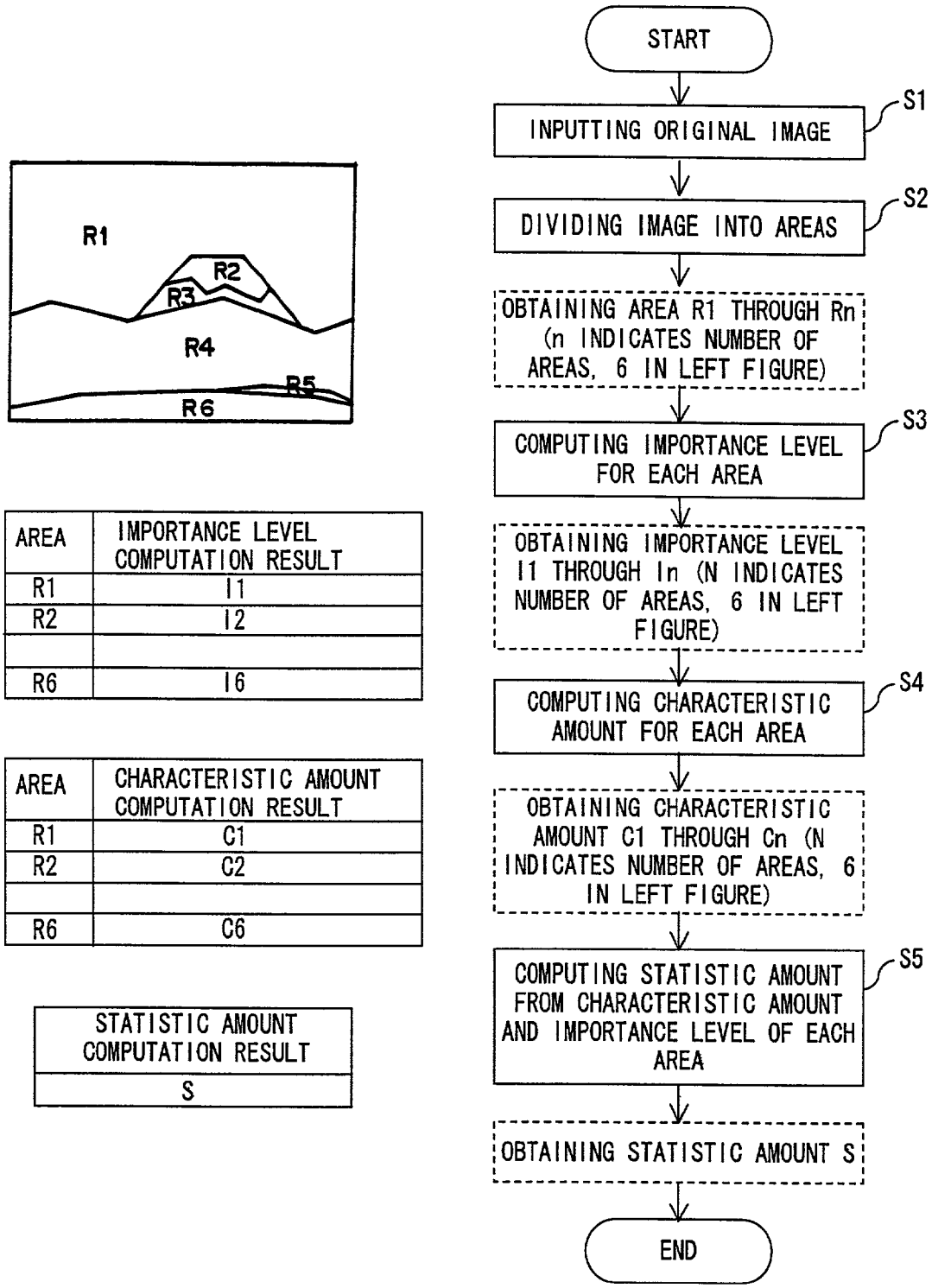
FIG. 6 is a flowchart of the basic process of the image status estimating method according to the present invention.

FIG. 6 is a flowchart of the basic process of the image status estimating method according to the present invention. The flowchart in FIG. 6 shows the process performed by an image processing program operated by an information processing device. When the process is started as shown in FIG. 6, an original image whose status is to be estimated is input in step S1. The original image is a color image.

The image processing program performs an area dividing process in step S2. Since an actual color image cannot be shown, FIG. 6 shows on its left a result of dividing an image into areas. The input color image is divided into areas R1 through R6.

In FIG. 6, the block of dotted lines does not indicate an actual process, but it indicates a result of a process. As a result of dividing an image into areas in step S2, Rn is normally obtained from n areas R1. In this example, n is 6.

In this example, the original image is an image of Mt. Fuji viewed from Lake Ashi, R1 is a blue area of the sky, R2 is a white area of snow around the top of the mountain, R3 is a dark area indicating other mountains without snow, R4 is a green area indicating trees, R5 is a gray area indicating a sand beach on the shore of the lake, and R6 is a blue area indicating the lake.

According to the present embodiment, the image is divided into areas according to the tone level information about pixels, for example, a common RGB tone level. The detailed method of dividing an image into areas is described in the following document.

Document 5) Takeshi Agui, et al. 'Process and Recognition of Image' P 128-139, published by Shokodo.

This document describes two methods of dividing an image into areas. They are a clustering method on an original image, and a clustering method in a feature space. In the clustering method on an original image, the level and the change rate of the tone level of a pixel are referred to in dividing an image into areas.

For example, objects are regarded as the same as each other when their tone level change rates are substantially the same. For example, when a small target area has the same feature as its small adjacent area, they are integrated into one area in an area developing method, thereby dividing an image into areas.

An image can be divided using only the tone level of a pixel or its change rate. In this case, an image can be divided into areas as if it is divided based on the feeling of a person.

Then, in step S3, the importance level, that is, the weight coefficient, is computed for each area. The weight coefficient indicates the importance level for each area when a statistic amount for estimation of the status of the entire image is computed from the characteristic amount of each area as described above, and the importance level I1 through In can be obtained for n areas (6 areas in this case).

The weight coefficient can be determined corresponding to the number of pixels forming an area. A very small area can be assigned the weight coefficient of 0 to avoid the problem that a small area can be overestimated. To assign the weight coefficient of 0 is to ignore the area when the statistic amount is computed.

In addition, a weight coefficient can be determined based on the position of an area in an image. For example, when a photograph is taken, a main object is frequently positioned in the central area. Therefore, a larger weight coefficient can be assigned to the central area.

Then, a characteristic amount is computed for each area in step S4. Based on the characteristic amount, the status of an image can be estimated, and the characteristic amount obviously relates to the quality of an image. For example, it is desired that a characteristic amount can be computed after converting the tone level of an image into a brightness value or a chroma value. It is desired that an average value of the entire area is used as a representative value of the area regardless of a tone level, a brightness value, or a chroma value to be used as a characteristic amount. As a result of computing the characteristic amount, C1 through C6 are obtained for each area in FIG. 6.

Finally, in step S5, a statistic amount is computed using a characteristic amount and an importance level. The statistic amount is an index for estimation of the status of an image, and is desired to relate to the feeling of a person. Therefore, an average value, a standard deviation, etc. are used by computing them with the respective weight coefficients.

As described above, for example, to apply the weight of 0 as a weight coefficient, an area containing a smaller number of pixels is ignored, and the data corresponding to the area is removed in computation. In any case, by obtaining the statistic amount S, the status of an image is estimated from the value, and the statistic amount indicating the status of an image based on the feeling of a person can be obtained using an average value and a standard deviation value as a statistic amount.

Although not shown in FIG. 6, if a correction is made such that the optimum state of an image can be obtained based on the value of the statistic amount as an estimation result on the status of the image, a correction can be made corresponding to the feeling of a person on the image.

For example, a value of a statistic amount for an image, which is liked by a number of people, is defined as a predetermined value, and it is compared with a statistic amount computed from an image to be corrected, thereby making a correction.

Otherwise, a desired correcting parameter can be obtained by generating several types of corrected images for an image to be corrected using several different correcting parameters.

Figure 7:
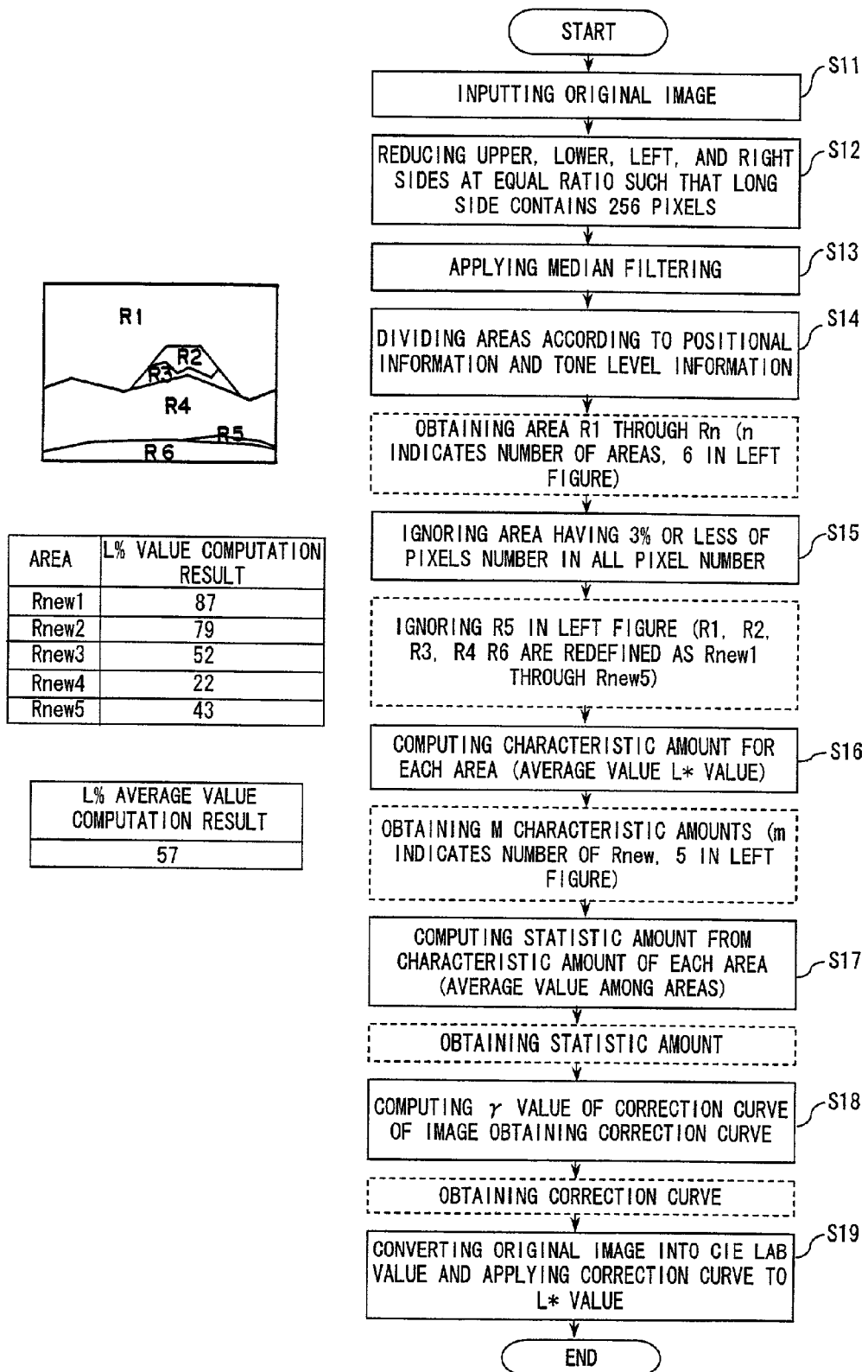
FIG. 7 is a flowchart of the image correcting process according to the first embodiment of the present invention.

FIG. 7 is a flowchart of an image correcting process according to the first embodiment of the present invention. The flowchart shown in corresponds to the processes performed by image correcting software operated by an information processing device, and is designed to automatically correct an input image into a high-quality image. In the following explanation, all processes are realized by software. However, according to the first embodiment of the present invention, a part or all of the process can be realized by hardware technology.

In FIG. 7, as shown in FIG. 6, the block of dotted lined is not an actual process, but indicates a result of a process.

In FIG. 7, an original image is input in step S11, and image correcting software performs a reducing process of reducing an image into a predetermined size in step S12. For example, the reducing process is performed on an original image having the number of pixels forming a longer side exceeding 256 using the same ratio in the vertical and horizontal directions, and the number of pixels forming the longer side is set to 256.

In step S13, a median filter is applied to perform an operation of replacing the tone level of a central pixel with the central value of the tone level of the pixel in the observation window, thereby reducing noise. Reducing noise is not an essential process, but it is desired to reduce noise to prevent small spots of noise from being regarded as independent areas. Especially if it is necessary to perform a high-speed process, the process can be omitted. The following document describes a median film.

Document 6) C. D. Watkins et al. 'Modern Image Processing: Warping, Morphing, and Classical Techniques' p 64-67, Academic Press Inc.

Then, the image correcting software divides an image into areas according to the positional information and tone level information about pixels in step S14. In this example, a clustering method is performed on an original image. The original image is the same as that shown in FIG. 6, and 6 areas R1 through R6 are obtained as a result of dividing an image into areas.

In the process flow shown in FIG. 6, the weight coefficient of each area is computed in step S3 after dividing an image into areas in step 2. In FIG. 7, instead of computing the weight coefficient in step S15, an area having the number of pixels of 3% or less of the total number of the pixels of an image is ignored. In the 6 areas of the original image, since the area R5 is small and has the number of pixels of 3% or less of the total number of the pixels of the image, the area R5 is ignored because it is considered that an area having a small number of pixels is has a small influence on the feeling in brightness or contrast of the image.

Numbers are newly given to the valid areas except R5 to be ignored. That is, Rnew 1 through Rnew m are assigned to the areas R1, R2, R3, R4, and R6, where m indicates the number of valid areas. Thus, five valid areas have been redefined.

Then, in step S16, the image correcting software computes a characteristic amount of each valid area. A characteristic amount to be computed is expressed by an L* value of CIE LAB indicating the brightness of an image, and an average value is obtained corresponding to each area. The CIE LAB value is described in the following document, but it basically indicates the color feeling level of a person. On the other hand, an RGB value can indicate different colors between a liquid crystal display and a CRT.

Document 7) R. W. G. Hunt 'Measuring Color, Third Edition' p 63-65, published by Fountain Press.

The conversion of an image from a tone level (RGB value) into an L* value is performed through a CIE XYZ value. The conversion from an RGB value into a CIE XYZ value is described in the following document. The CIE XYZ value corresponds to a measurement by a measure, and does not correspond to the feeling of a person.

Document 8) Same as Document 7, p 191-199.

The conversion from a CIE XYZ value into a CIE LAB value is described in the following document. That is, on a reference display, an RGB value is converted into a CIE XYZ value, and a CIE XYZ value is further converted into a CIE LAB value.

Document 9) Same as Document 7, p 63-65.

Figure 8:
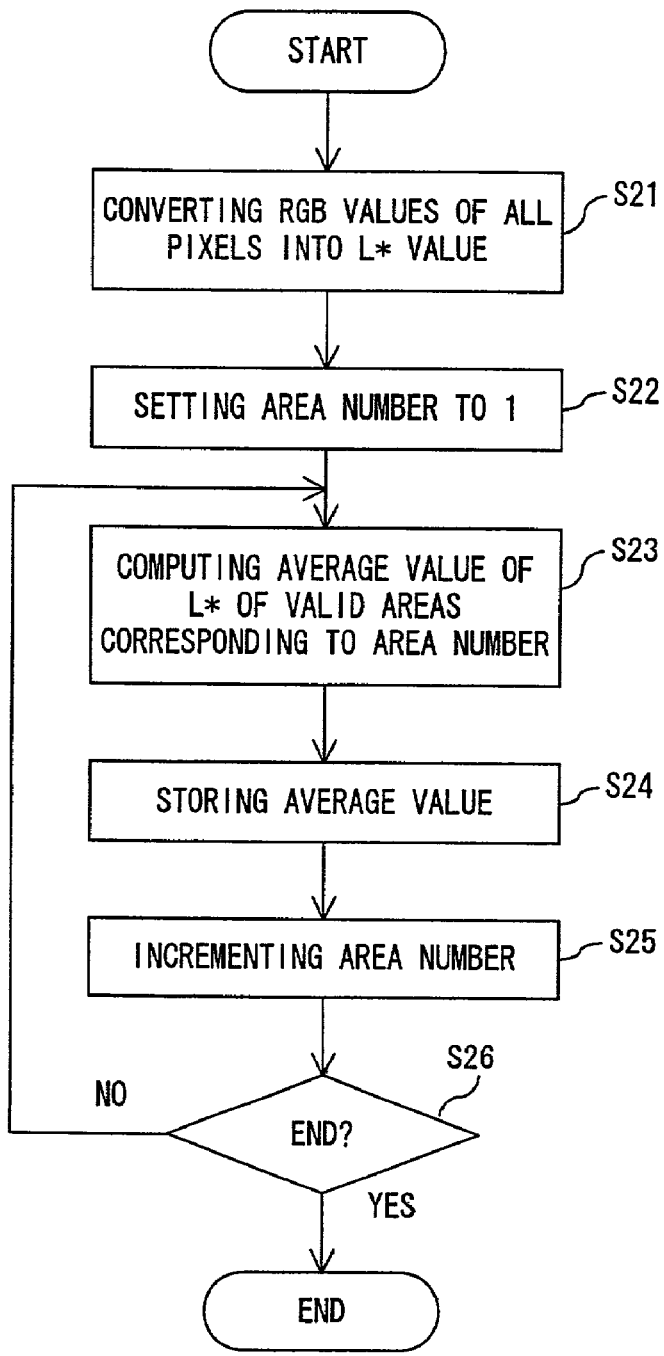
FIG. 8 is a flowchart of the details of the characteristic amount computing process.

FIG. 8 shows the process in step S16 shown in FIG. 7, that is, a detailed flowchart of the characteristic amount computing process on each area.

In FIG. 8, when the process is started, the image processing software first converts the RGB values into the L* values of the CIE LAB for all pixels in step S21. The values a and b of CIE LAB are not used. In step S22, the area number is initialized into 1, an average value of the L* value of the area corresponding to the area number is computed in step S23, and the computation result is stored in the memory in step S24.

The area number is incremented in step S25, it is determined in step S26 whether or not the completion condition has been satisfied, that is, whether or not the process has been completed on m valid areas, the processes in and after step S23 are repeated if it has not been completed, and the process terminates if it is determined in step S26 that the completion condition has been satisfied.

In the process shown in FIG. 8, an average value is obtained by converting the RGB value into the L* value for all pixels forming an original image. However, an average value of each RGB value can be first obtained for each valid area, and then the obtained average RGB value can be converted into an L* value to obtain an average value of the L* value for each area. As a result, average values L* reg 1~L* reg m of the L* value of each valid area can be obtained.

Back in FIG. 7, the image correcting software computes a statistic amount in step S17. In this step, the average values of the L* values obtained for the areas of m valid areas are averaged to obtain a statistic amount. Each area can be weighted.

First, considering the process speed and the simpler process, the statistic amount can be computed without weighting each area. Ignoring a small area in step S15 corresponds to assigning the weight of 0 to the area. In this case, an average value among the areas as a statistic amount is computed by the following equation $$L^*a v r = \frac{1}{m}\sum_{i=1}^{m} L^*r e g_i \qquad (1)$$

When an image is divided into areas, the influence on the brightness of the image recognized by a person for each area is not always equal, but depends on the size of an area. Considering this point, the statistic amount (an average value of L* values among areas) is computed by the following equation.

$$L^*a v r_w = \frac{\sum_{i=1}^{m} w_i \cdot L^*r e g_i}{\sum_{i=1}^{m} w_i} \qquad (2)$$

where $$w_i = p_i^{1/2}$$

where pi indicates the number of pixels of the i-th valid area. A weight coefficient wi is computed using the number of pixels. In this example, since the square root of pi is defined as a weight coefficient, two areas having a four-time difference in size are evaluated by a two-time difference in weight coefficient.

The distance between the center of gravity of each area and the center of the image can be defined as a reference weight coefficient because there is a stronger possibility that an important object is detected closer to the center. Practically, the weight can be computed by the following equation. In the equation, di indicates the distance between the center of the image and the center of gravity of the i-th area, and Llongh indicates the length of a longer side of the image.

$$w_i = 1/(d i + L_{longh}) \qquad (3)$$

The statistic amount corresponding to the original image is computed in the above mentioned process, and the status of the image is estimated. In FIG. 7, the average value of 57 of L* indicating the brightness as a statistic amount is obtained.

Normally, L* can be in the range from 0 to 100, and the intermediate value of 50 is a reference value. Thus, the original image is somewhat bright. It can be checked in advance by a number of people, for example, 100 persons as to what L*avr value is desired for an image. In this example, it is determined whether or not an image is bright based on the reference number of 50.

When the status of an image is estimated, the image is corrected based on the result. In this example, a correction is made by applying a tone level correction curve to the L* value indicating the brightness of an image. An exponential function normally referred to as a γ curve is used as a tone level correction curve.

$$L^*_{correct} = 100 \cdot (L^*_{original}/100)^\gamma \quad (4)$$

where L*original indicates an L* value before making a correction, and L*corrected indicates an L* value after making a correction.

In the correction of an original image, the γ value is computed corresponding to the correction curve of an image in step S18 shown in FIG. 7. The γ value is defined on condition that the value of the L*avr computed as a statistic amount is converted into 50, and can be computed by the following equation.

$$\gamma = \log(0.5)/(\log(L^*avr) - \log(100)) \quad (5)$$

When a correction curve is given, the correction curve is applied to the L* value of the original image in step S19, thereby making the correction.

Figure 9:
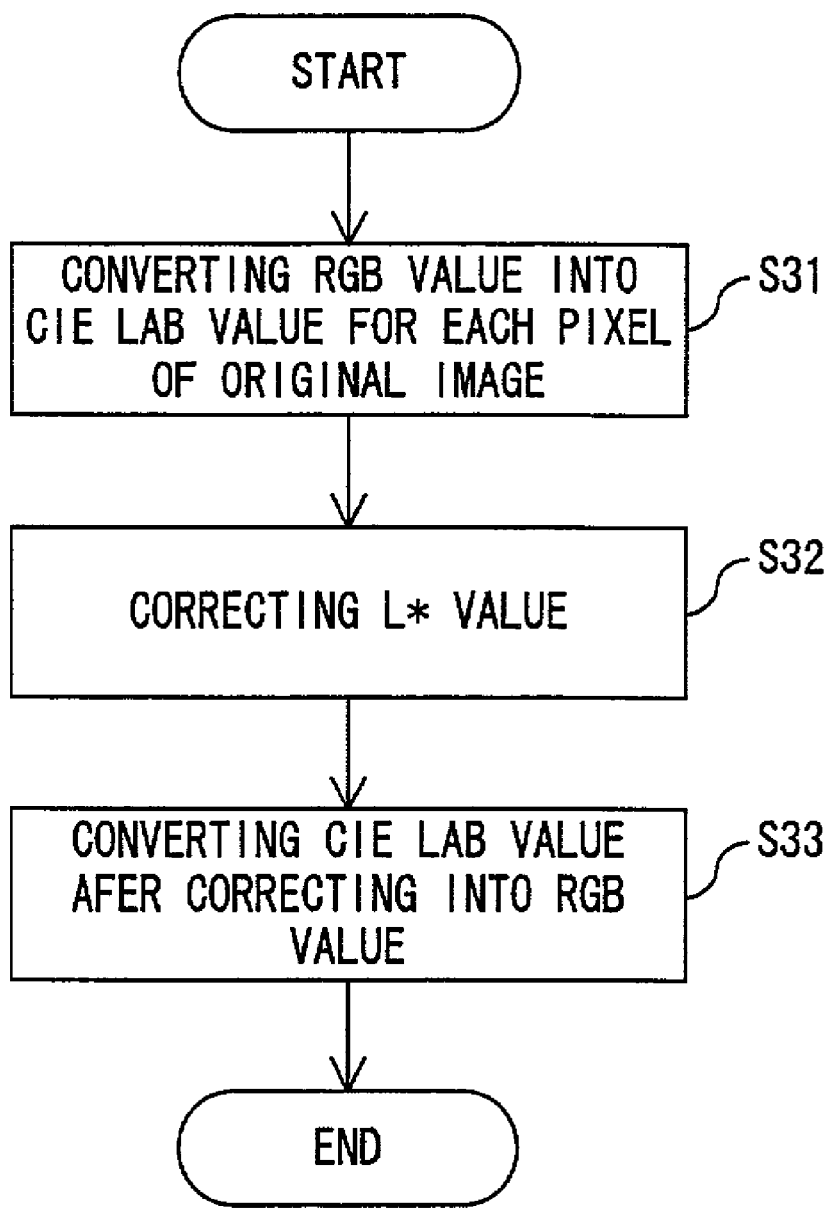
FIG. 9 is a flowchart of the details of the original image correcting process.

FIG. 9 is a flowchart showing the detailed correcting process.

First, in step S31, the image correcting software converts an RGB value into a CIE LAB value for each pixel of an original image. A correction is made in step S32 using the equation (4) on the L* value obtained in step S31. In step S33, the CIE LAB value after the correction is converted into the RGB value, thereby terminating the process. In step S32, the values of a and b of the CIE LAB are not corrected. Thus, the brightness of an image is completely corrected.

As described above, according to the present embodiment, although a specific tone level is distributed in a large area, the influence of the tone level is not exceedingly large as in the first conventional method of correcting an image.

Next, as described above by referring to the equation (1), the tone levels of all pixels are reflected by statistic amounts, and an appropriate correction can also be made to an intermediate tone level when compared with the second method performed without considering the tone level around the intermediate tone level.

Furthermore, for example, by ignoring a small area as described in step S15, there is a smaller possibility that a small area is overestimated than in the third conventional method.

Additionally, as described above in step S2 shown in FIG. 6, an area dividing process is performed according to tone level information about a pixel, for example, using a common RGB tone level. Therefore, the process is performed such that the feeling of a person is favored. As a result, a desired correction is made corresponding to the contents of the image.

Described below is the second embodiment of the present invention. The second embodiment also relates to the process performed by image quality correcting software for correcting an input image into a high-quality image. According to the second embodiment of the present invention, a part or all of the process can be realized by hardware.

According to the first embodiment of the present invention, a statistic amount is obtained for estimation of the status of an original image, and a correcting parameter for correction of the original image from the statistic amount is analytically obtained.

On the other hand, according to the second embodiment of the present invention, a correction is made to an original image basically using some different correcting parameters, a characteristic amount indicating the status of a pixel is obtained for a corrected image obtained as a result of the correction, and a correcting parameter for a correction result indicating the most desired characteristic amount is defined as the optimum correcting parameter.

FIG. 10 is a flowchart of the image correcting process according to the second embodiment of the present invention.

In FIG. 10, when the process is started, processes of reducing an original image, applying a median filter, dividing an image into areas, ignoring an area having the number of pixels equal to or smaller than 3% of the total number of pixels of the image, etc. as the processes in steps S11 through S15 shown in FIG. 7 are performed in steps S41 through S45.

As described above, according to the second embodiment of the present invention, a correction is made to an original image using some different correcting parameters. Therefore, corrections are repeated to the original image with the value of the correcting parameter seed k sequentially changed. The correcting parameter seed k is a value directly corresponding to the correcting parameter γ described above in the first embodiment, and the value of γ (γc in the second embodiment) is computed from the value of the correcting parameter seed k by the following equation.

$$\gamma_c = 1.2^k \quad (6)$$

In the second embodiment, a total of 11 types of corrected images can be generated with the value of the correcting parameter seed k sequentially increased by 1 from −5 to +5. In step S46, the value of the correcting parameter seed k is initialized to −5, a correcting parameter γc is computed using the value in step S47, and the entire image is corrected using the correcting parameter in step S48.

In this correcting process, a correction is made by the following equation on an RGB value of a pixel depending on whether or not each value (Roriginal, Goriginal, and Boriginal) before the correction is smaller than 0.5, thereby obtaining an RGB value (Rcorrect, Gcorrect, and Bcorrect) after the correction. In this process, the RGB value is not in the range from 0 to 255, but is normalized into the range from 0 to 1 by dividing the value by 255.

$$\begin{aligned}
&\text{if } R_{original} < 0.5 \\
&\quad R_{C_{correct}} = R^{\gamma_c}_{original}/2 \\
&\text{else} \\
&\quad R_{C_{correct}} = 1 - ((2 \cdot (1 - R_{original}))^{\gamma_c})/2 \\
&\text{if } G_{original} < 0.5 \\
&\quad G_{C_{correct}} = G^{\gamma_c}_{original}/2 \\
&\text{else} \\
&\quad G_{C_{correct}} = 1 - ((2 \cdot (1 - G_{original}))^{\gamma_c})/2 \\
&\text{if } B_{original} < 0.5 \\
&\quad B_{C_{correct}} = B^{\gamma_c}_{original}/2 \\
&\text{else} \\
&\quad B_{C_{correct}} = 1 - ((2 \cdot (1 - B_{original}))^{\gamma_c})/2
\end{aligned} \quad (7)$$

Figure 11:
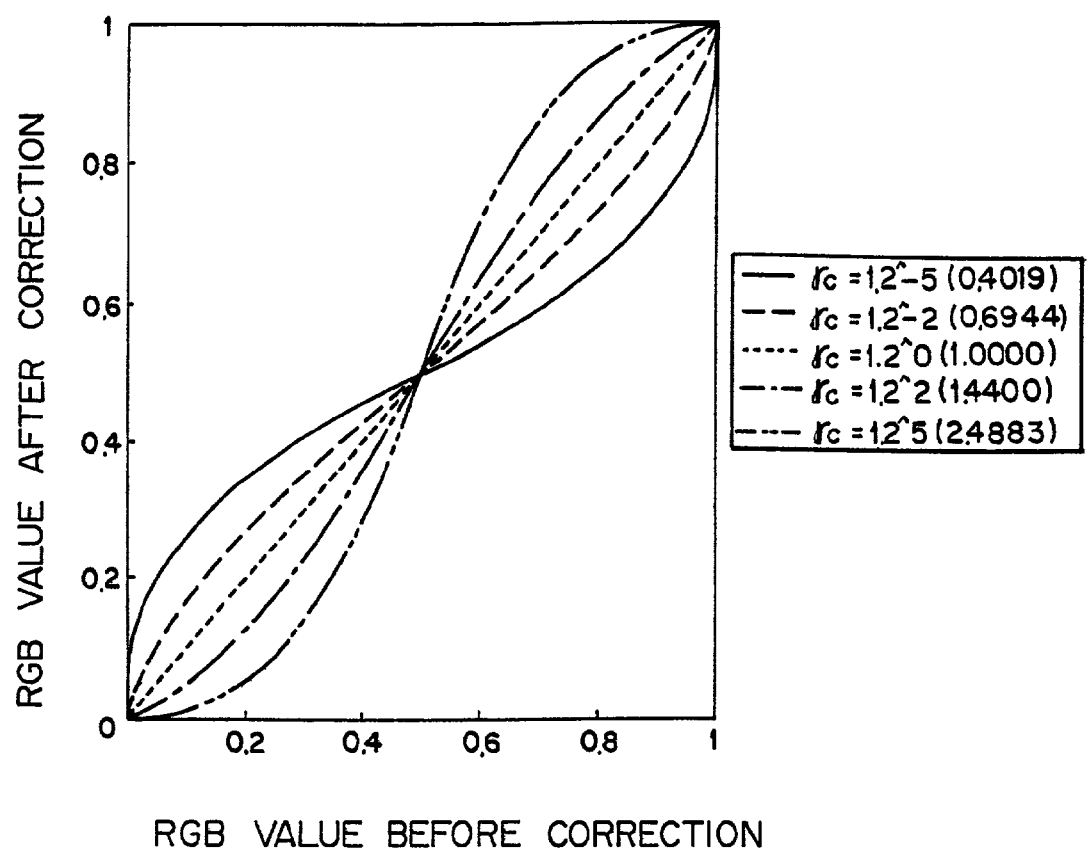
FIG. 11 shows an example of a correction curve.

FIG. 11 shows an example of a correction curve expressed by the equation (6). FIG. 11 shows five correction curves corresponding to the correcting parameter γc when the value of the correcting parameter seed k is −5, −2, 0, 2, and 5.

Back in FIG. 10, an average value of the L* value indicating the brightness as in step S16 shown in FIG. 7 is computed as a characteristic amount of each area obtained by dividing an image in step S49, and a statistic amount is computed using the characteristic amount in step S50.

According to the second embodiment, a standard deviation L*std computed based on the characteristic amount L*regi of each area is computed using the L*avr as a characteristic amount according to the first embodiment as a statistic amount. The equation is described below.

$$L^*std = \left[\frac{1}{m}\sum_{i=1}^{m}(L^*avr - L^*reg_i)^2\right]^{1/2} \quad (8)$$

In the equation (8), a processing speed and a simpler process are considered, and no weight is assigned when standard deviation is computed. However, the influence of the brightness recognized by a person on each area more or less depends on the size of an area. When this is taken into account, the standard deviation weighted by a weight coefficient wi using the number of pixels pi for a valid area i can be obtained. The standard deviation is obtained by the following equation.

$$L^*std_w = \left[\frac{\sum_{i=1}^{m}w_i \cdot (L^*avr - L^*reg_i)^2}{\sum_{i=1}^{m}w_i}\right]^{1/2} \quad (9)$$

where $w_i = p_i^{1/2}$

As described above, the process up to the computation of a statistic amount for the value of the correcting parameter seed k of −5 is completed, the statistic amount is stored as a value of $S_k$ in step S51, the value of the correcting parameter seed is incremented in step S52, it is determined in step S53 whether or not the value of the parameter seed k is larger than 5, and the processes in and after step S47 are repeated because it is still not larger than 5.

If it is determined in step S53 that the value of k exceeds 5, that is, that the value is 6, then a plurality of values of the parameter seed k, in this case, the values of the statistic amount $S_k$ obtained corresponding to 11 values, are compared with a predetermined value in step S54. The value of the parameter seed k corresponding to the value closest to the predetermined value is obtained as kopt, the correction curve determined by the correcting parameter γc corresponding to the parameter seed kopt is applied in step S55 to the original image before the reducing process in step S42, thus the correction is performed, thereby terminating the process.

A predetermined statistic amount is determined after checking as in the first embodiment what L*std value of an image is desired in some images by, for example, about 100 users. A normally reasonable value as the L*std value is 20.

As described above, the status of an image is obtained from an average value of brightness in the first embodiment, and it is obtained from the standard deviation of brightness, that is, from the unevenness in brightness as the image contrast, in the second embodiment.

However, the contrast in an image recognized by a person is more or less subject to the influence of the chroma value of the image. For example, a portion recognized as brilliant red has a value of R in the RGB value close to 255 and values of G and B close to 0. Thus, if a color having a large chroma value exists in an image, the RGB value becomes suddenly large or small. Therefore, an average value of each area obtained by dividing an image is obtained, and the standard deviation of the average values can be defined as a statistic amount.

The standard deviation RGBstd of an RGB value is computed by the following equation where Rreg i, Greg i, Breg i is the statistic amount of the i-th valid area, that is, the average value of the R, G, and B values of the area.

$$\left.\begin{array}{l}Ravr = \dfrac{1}{m}\sum_{i=1}^{m}Rreg_i, \\[4pt] Gavr = \dfrac{1}{m}\sum_{i=1}^{m}Greg_i, \\[4pt] Bavr = \dfrac{1}{m}\sum_{i=1}^{m}Breg_i, \\[4pt] RGBstd = \left[\dfrac{1}{3m}\sum_{i=1}^{m}(Ravr - Rreg_i)^2 + (Gavr - Greg_i)^2 + (Bavr - Breg_i)^2\right]^{1/2}\end{array}\right\} \quad (10)$$

When the influence of the chroma is too large using an RGBstd, an average value between the RGBstd and the L*std can be used as a statistic amount. When the brightness and the chroma value are to be definitely discriminated from each other in the process, a C*ab can be used as a chroma value to be computed from the CIE LAB value. The chroma value is described in the following document.

Document 10) Same as Document 7, p 63-65.

Practically, C*abstd is obtained using the following equation (11), and an average value between the C*abstd and the L*std can be obtained. The C*abreg i indicates an average value of the C*ab in the i-th valid area.

$$\left.\begin{array}{l}C_{ab}^*avr = \dfrac{1}{m}\sum_{i=1}^{m}C_{ab}^*reg_i, \\[4pt] C_{ab}^*std = \left[\dfrac{1}{m}\sum_{i=1}^{m}(C_{ab}^*avr - C_{ab}^*reg_i)^2\right]^{1/2}\end{array}\right\} \quad (11)$$

In the above mentioned second embodiment, a plurality of values are used as values of the correcting parameter seed k, a correction is made to an original image corresponding to each value, a statistic amount corresponding to each corrected image is obtained, and a corrected image indicating the value closest to a predetermined value is selected. However, as a variation of this value is selected. However, as a variation of this embodiment, a correction is made to the original image with the correcting parameter seed changed, a statistic amount for the corrected image is compared with a predetermined value each time the corrected image is obtained, and the process is aborted when the closest corrected image is obtained.

Figure 12:
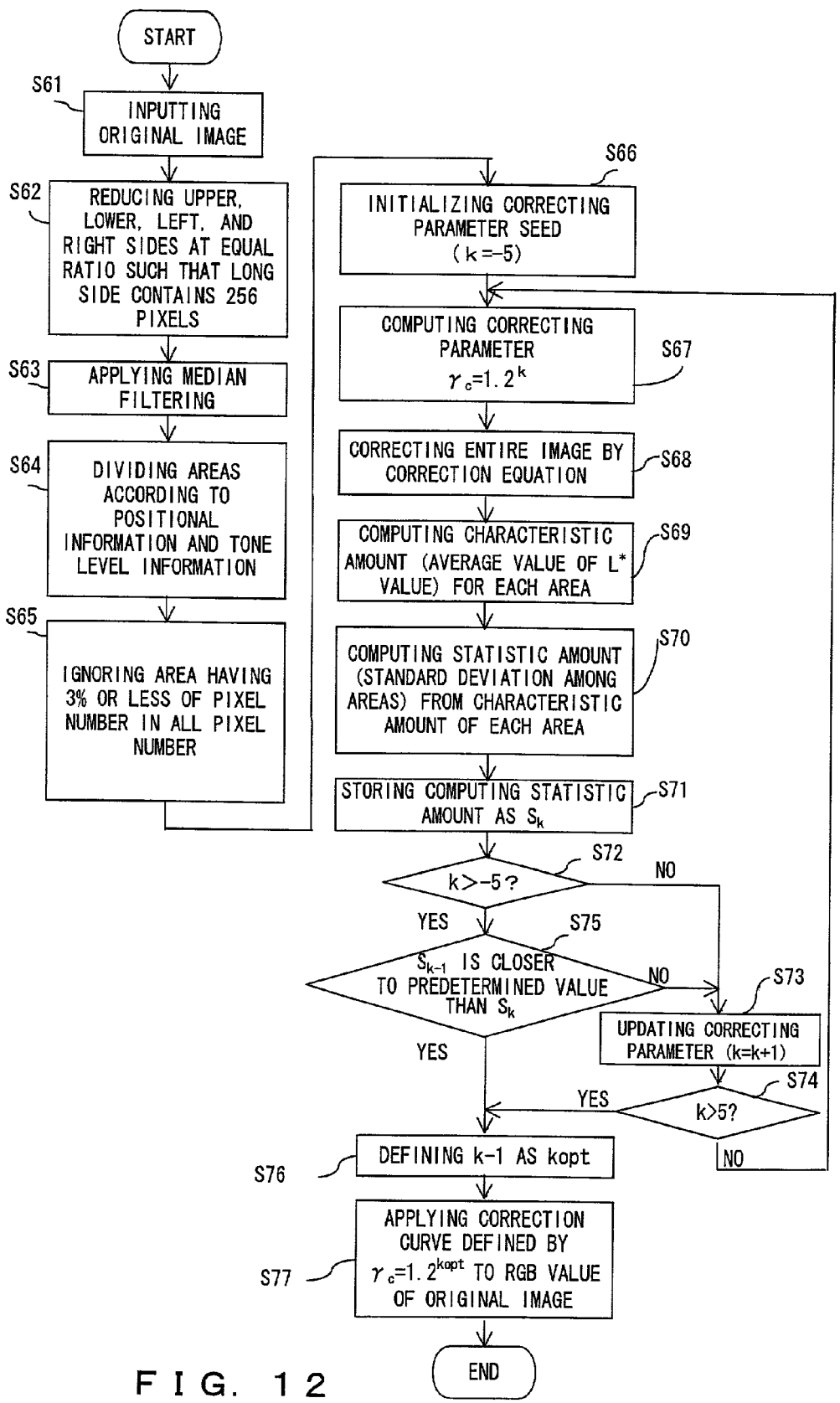
FIG. 12 is a flowchart of the image correcting process in a variation of the second embodiment of the present invention.

FIG. 12 is a flowchart of the process according to a variation of the second embodiment.

In FIG. 12, the process from inputting an original image in step S61 to storing the statistic amount $S_k$ computed in step S71 is the same as the processes in steps S41 through S51.

Then, in step S72, it is determined whether or not the value of the correcting parameter seed k is larger than −5. First, the initial value is set to k=−5 in step S66, control is passed to step S73 as a result of the determination, the value of the correcting parameter seed k is incremented, and k is set to −4 in this example. Then, it is determined whether or not k has exceeded 5 in step S74. Since it does not exceed 5 in this example, the processes in and after step S67 are repeated.

Then, in step S72, since the value of k is −4, control is passed to the process in step S75, and it is determined whether or not a statistic amount $S_k$ computed immediately before in step S71 is closer to a predetermined statistic amount value than $S_{k-1}$, in this example it is determined whether or not $S_{-5}$ is closer to a predetermined statistic amount value than $S_{-4}$.

If, for example, $S_{-4}$ is closer to a predetermined value than $S_{-5}$, then there is a stronger possibility to obtain a value of $S_k$ closer to a predetermined value by updating a correcting parameter seed and proceeding with the process. Therefore, control is passed to the process in step S73, the correcting parameter seed value is updated, it is determined whether or not the value of k updated in step S74 has exceeded 5, and the processes in and after step S67 are repeated when the value has not exceeded 5.

If it is determined in step S75 that $S_{-5}$ is closer to a predetermined value than $S_{-4}$, then the value of the characteristic amount is farther from the predetermined value by incrementing k. Although the value of the correcting parameter seed k is further incremented, the value of the characteristic amount becomes farther from the predetermined value. Therefore, for example, the value of −5 is defined as the value of kopt in step S76, and the correction curve determined by γc, the correction curve determined by γc corresponding to the value is applied in step S77, the original image is corrected, thereby terminating the process.

Then relationship between $S_k$ the value of the correcting parameter seed k and, that is, the standard deviation, is described below by referring to the correction curve.

Assume that there are three RGB values of 0.3, 0.5, and 0.7 input as shown in FIG. 11, that is, the values before a correction. If k=0, then the output value, that is, the value after a correction, is not changed. On the other hand, if k is negative, the correction curve has the shape of an inverted S. Therefore, the output values corresponding to 0.3 and 0.7 are close to 0.5. When k is closer to −5, the three output values are closer to 0.5, thereby reducing the value of the standard deviation, that is, $S_k$.

The image correction apparatus in the image status estimating method according to the present invention is described below as the third embodiment of the present invention.

Figure 13:
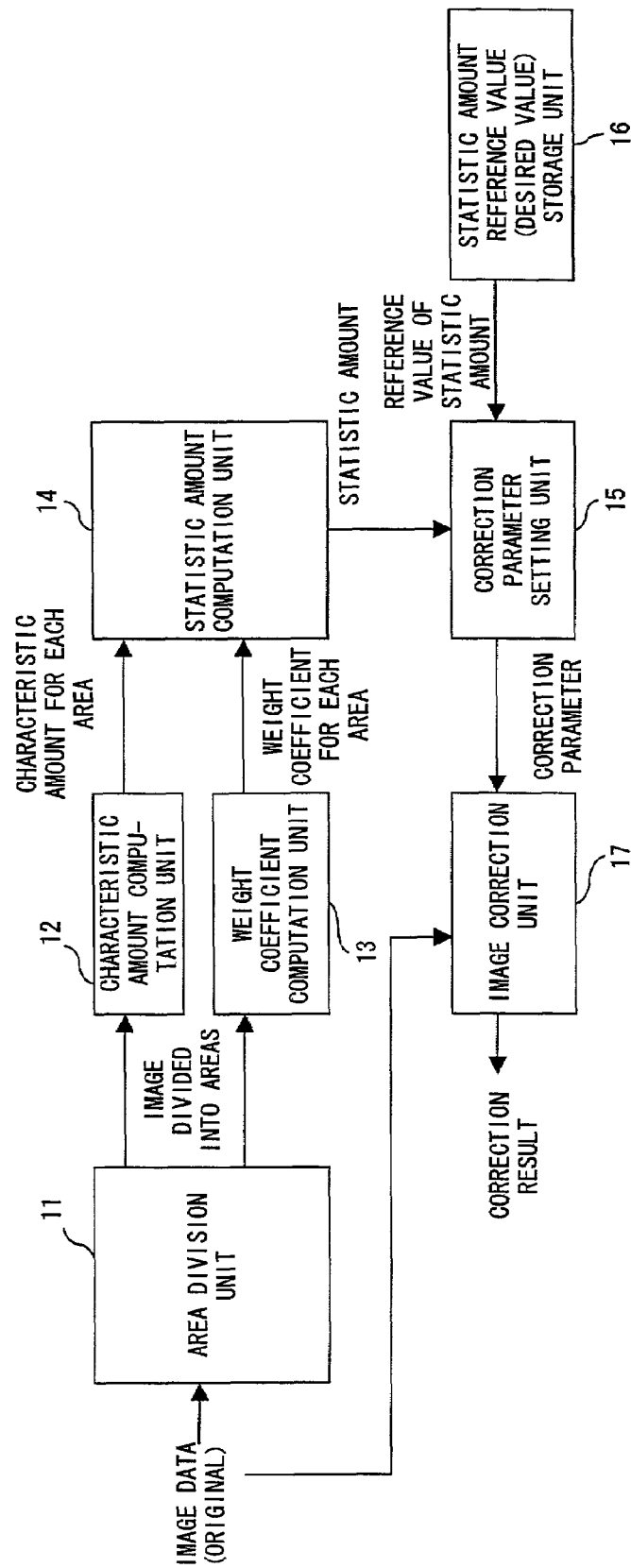
FIG. 13 is a block diagram of the configuration of the image correction apparatus corresponding to the first embodiment of the present invention.

FIG. 13 is a block diagram of the configuration of the image correction apparatus corresponding to the first embodiment of the present invention. In the first embodiment of the present invention, the statistic amount is obtained for an original image as described above, and the value is compared with a predetermined desired value to set a correcting parameter, thereby making a correction to the original image.

In FIG. 13, an original image is divided into a plurality of areas by an area division unit 11, a characteristic amount for each area is obtained by a characteristic amount computation unit 12 using the divided image. A weight coefficient computation unit 13 obtains a weight coefficient for each area. The weight coefficient can also be obtained by setting the weight to 0 for an area containing a small number of pixels as described above. A statistic amount computation unit 14 obtains a statistic amount for the original image, and the obtained value is compared with a desired statistic amount value stored in a statistic amount reference value storage unit 16. A correcting parameter setting unit 15 obtains a value of a correcting parameter γc. Using the value of the correcting parameter, an original image correction unit 17 corrects the original image, and an image correction result is obtained.

Figure 14:
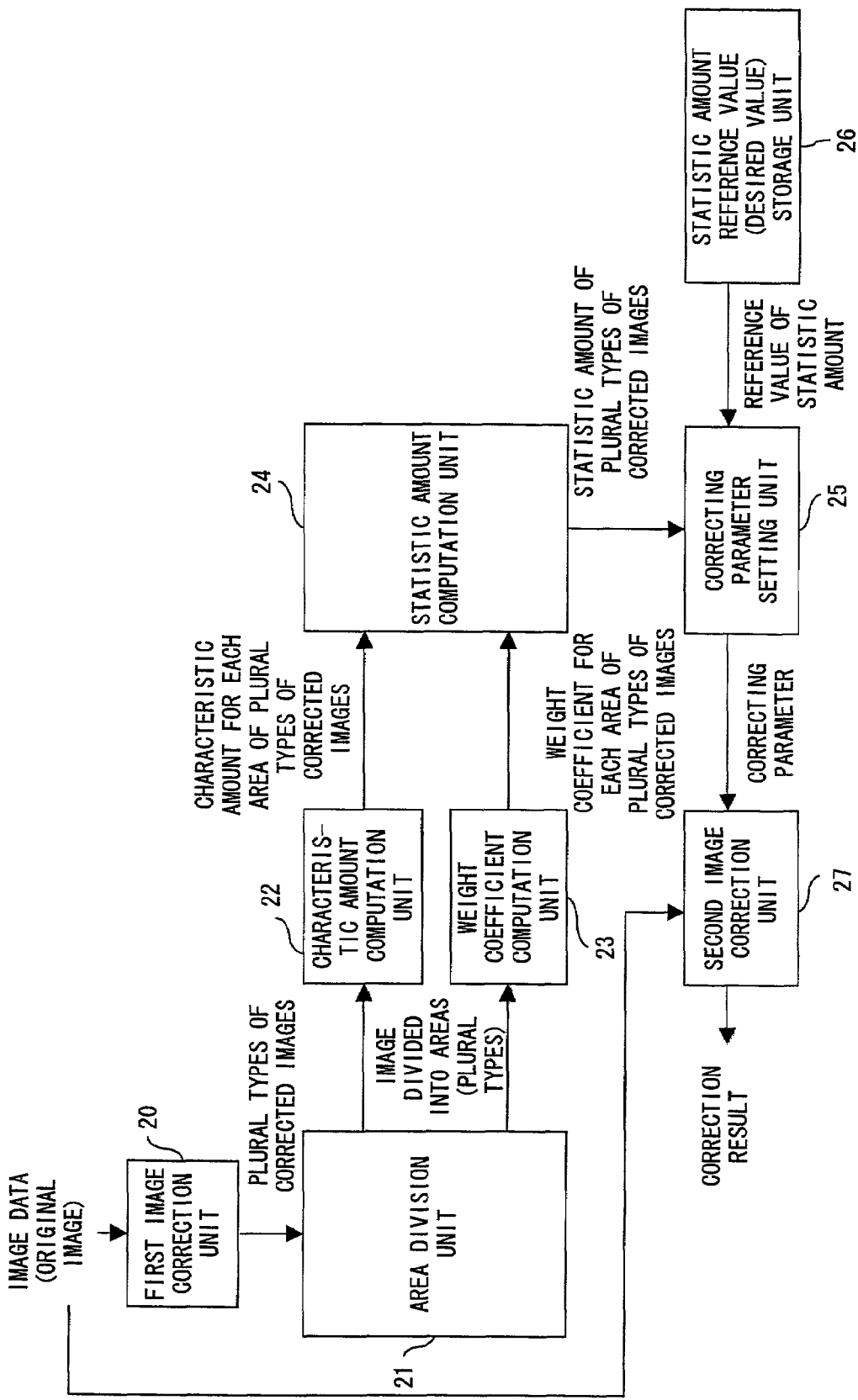
FIG. 14 is a block diagram showing the first example of the configuration of the image correction apparatus corresponding to the second embodiment of the present invention.
Figure 15:
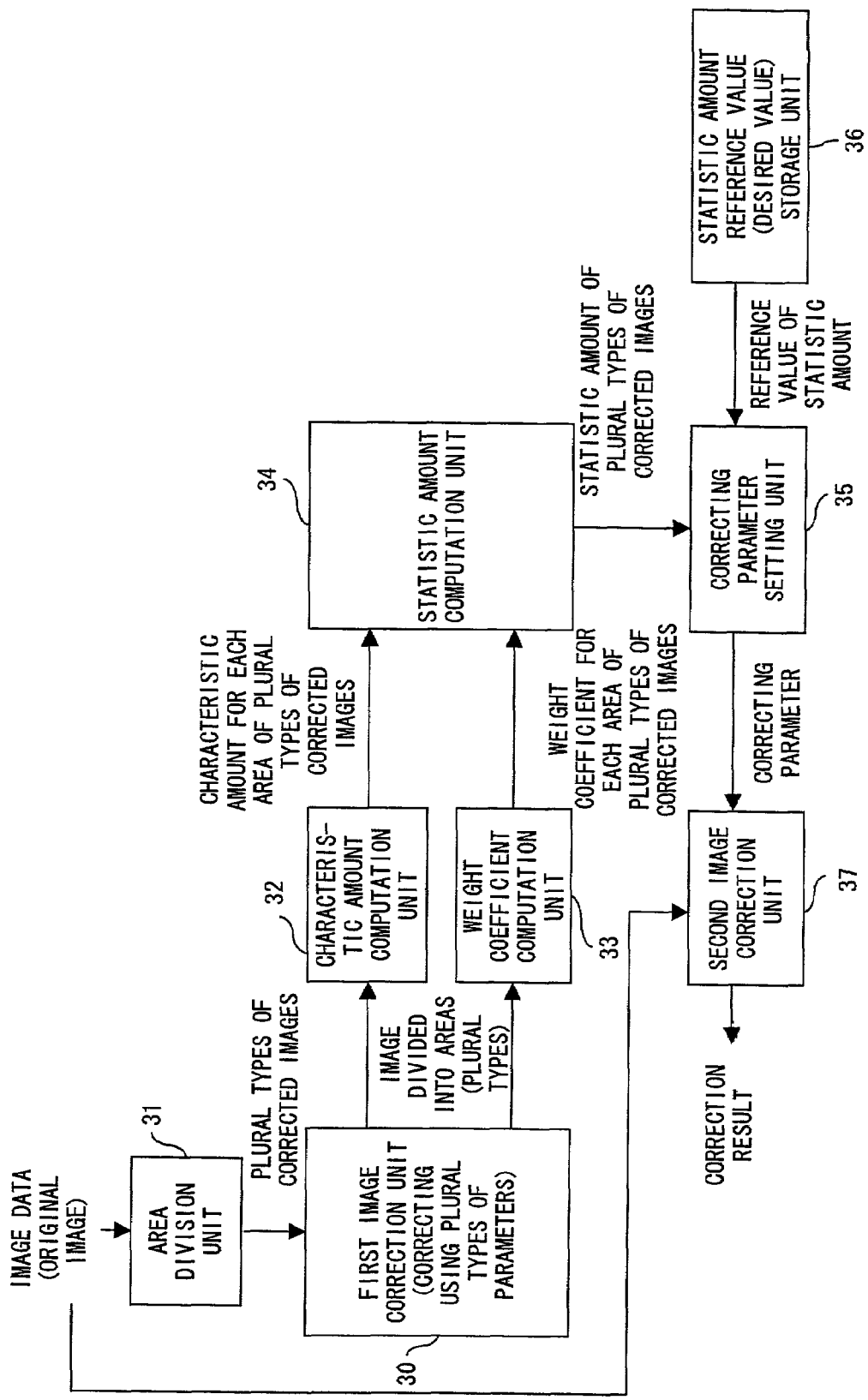
FIG. 15 is a block diagram showing the second example of the configuration of the image correction apparatus corresponding to the second embodiment of the present invention.
Figure 16:
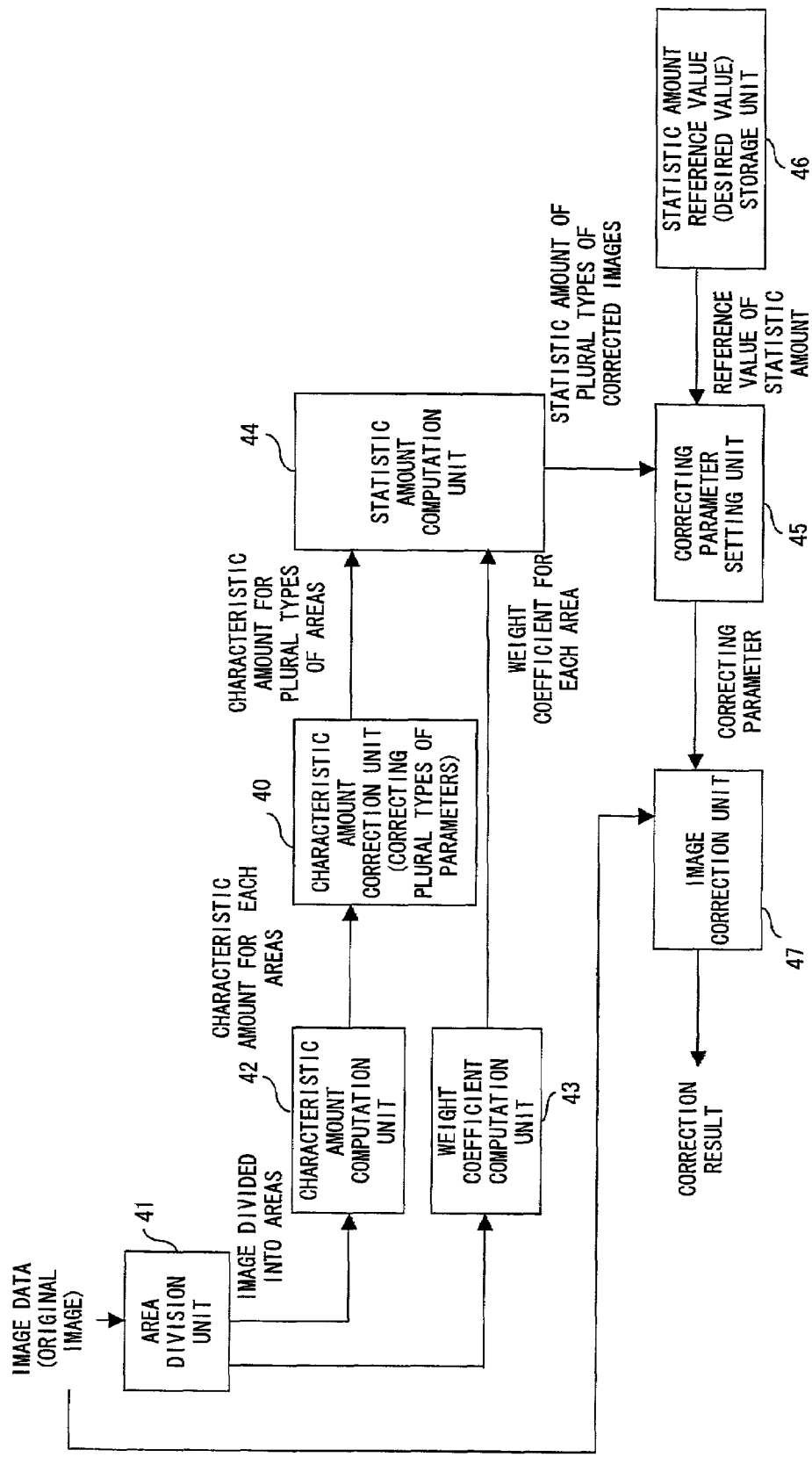
FIG. 16 is a block diagram showing the third example of the configuration of the image correction apparatus corresponding to the second embodiment of the present invention.

FIGS. 14 through 16 are block diagram showing examples of the configurations of the image correction apparatus corresponding to the second embodiment of the present invention.

FIG. 14 shows the first example of the configuration. FIG. 14 shows an example of the configuration of the image correction apparatus for performing an image dividing process on plural types of corrected images after they are first generated.

In FIG. 14, a first image correction unit 20 generates plural types of corrected images on an original image. An area division unit 21, a characteristic amount computation unit 22, a weight coefficient computation unit 23, and a statistic amount computation unit 24 respectively perform an area dividing process, a characteristic amount computing process, a weight coefficient computing process, and a statistic amount computing process on the plural types of corrected images, thereby obtaining the respective statistic amounts for the plural types of corrected images. These statistic amounts are compared by a correcting parameter setting unit 25 with the desired values stored in the statistic amount reference value storage unit 26, and a correcting parameter corresponding to the statistic amount closest to the desired value is provided for a second image correction unit 27. The second image correction unit 27 corrects the image data of the original image using the correcting parameter, and outputs a correction result.

FIG. 15 shows the second example of the configuration of the image processing device corresponding to the second embodiment of the present invention.

In the image processing device as the second example of the configuration, an original image is first divided into areas, and then plural types of corrected images are generated using the image divided into areas.

The configuration shown in FIG. 15 is compared with the configuration shown in FIG. 14 as follows. In FIG. 14, the first image correction unit 20 obtains plural types of corrected images corresponding to each correcting parameter from the original image using a plurality of correcting parameters. Then, the area division unit 21 divides the plural types of corrected images into areas. On the other hand, in FIG. 15, an area division unit 31 first divides the original image into a plurality of areas. Then, a first image correction unit 30 obtains a plurality of corrected images corresponding a plurality of parameters.

Then, as with the first configuration shown in FIG. 14, a characteristic amount computation unit 32 computes the characteristic amount of each area of plural types of corrected images, and a weight coefficient computation unit 33 computes the weight coefficient of each area of the plural types of corrected images from the plural types of images divided into areas. Then, a statistic amount computation unit 34 obtains a statistic amount for each of the plural types of corrected images from the computation results of the characteristic amount computation unit 32 and the weight coefficient computation unit 33. A correcting parameter setting unit 35 compares the statistic amount of each corrected image obtained by the statistic amount computation unit 34 with a desired value in the statistic amount reference value storage unit 36. Then, the correcting parameter setting unit 35 outputs a correcting parameter of a corrected image having the statistic amount of the value closest to the most desired value to a second image correction unit 37. The second image correction unit 37 corrects the original image using the correcting parameter, and outputs a result.

FIG. 16 shows the third example of the configuration of the image processing device corresponding to the second of the present invention.

In the image processing device shown in FIG. 16, the characteristic amount of each area is obtained, and then a correction is made using plural types of correcting parameters. Using the resultant characteristic amount of each of the plural types of areas, plural types of statistic amounts can be computed.

In FIG. 16, an area division unit 41 divides an original image into areas, a characteristic amount computation unit 42 obtains the characteristic amount of each area, a characteristic amount correction unit 40 corrects the characteristic amount using plural types of correcting parameters, and obtains the characteristic amount of each of the plural types of areas corresponding to each correcting parameter. Then, statistic amount computation unit 44 computes the statistic amounts of plural types of corrected images using the output of the characteristic amount computation unit 42 and the weight coefficient for each area obtained by a weight coefficient computation unit 43.

The configuration shown in FIG. 16 is different from the configurations shown in FIGS. 14 and 15 up to the computation of the statistic amount of the plural types of corrected images. The processes performed by a correcting parameter setting unit 45, a statistic amount reference value storage unit 46, and an image correction unit 47 using the statistic amounts of the plural types of corrected images are the same as those in the above mentioned first and second configuration examples.

With the configuration shown in FIG. 16, the characteristic amount correction unit 40 corrects the characteristic amount of each area, and outputs the correction result to the statistic amount computation unit 44. This corresponds to the characteristic amount correction unit 40 performing, for example, the process of obtaining an average value of L* corresponding to each area in step S23 shown in FIG. 8, and the correcting process on L* in step S32 shown in FIG. 9 to provide the correction result for the statistic amount computation unit 44.

Figure 17:
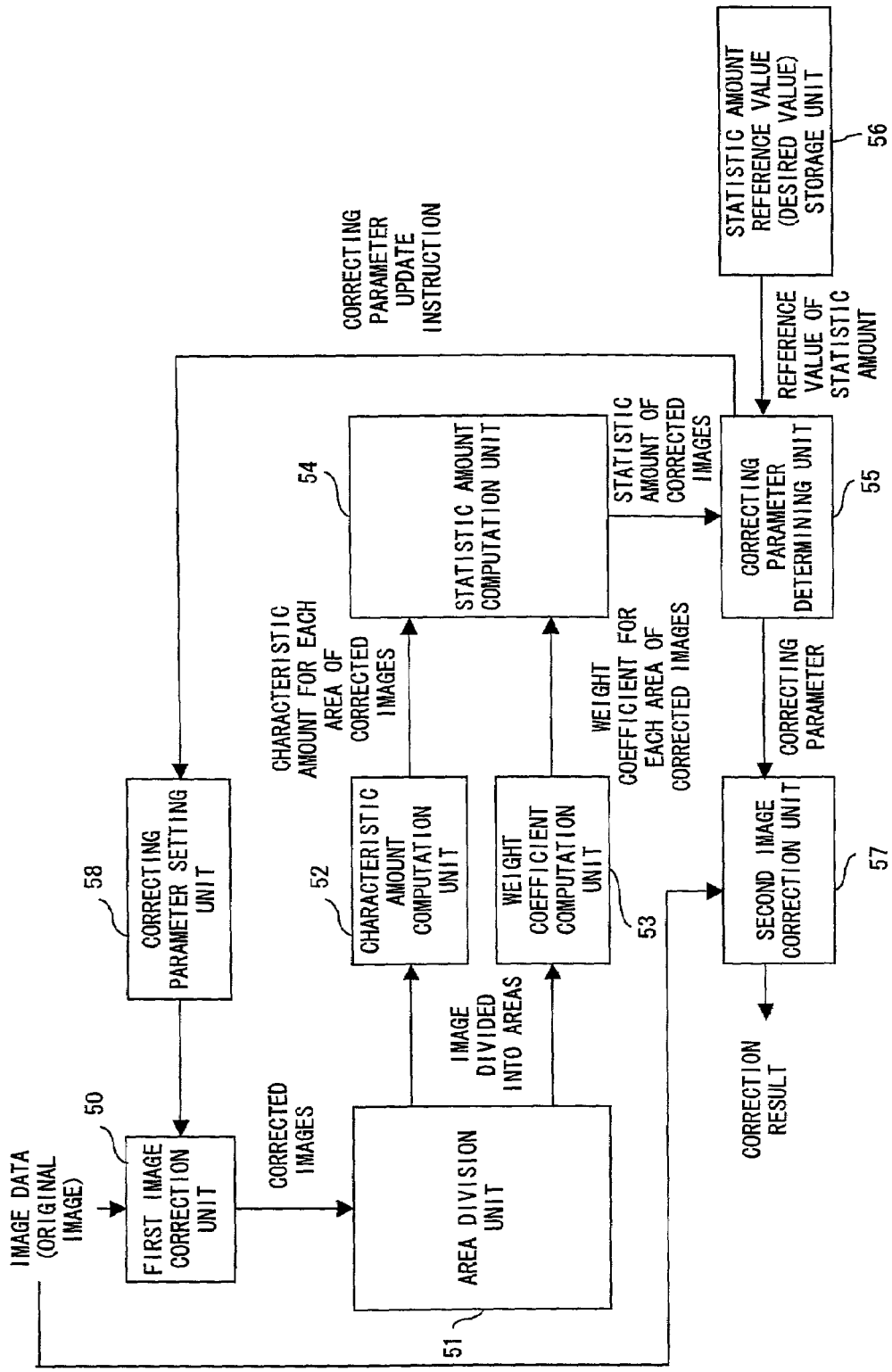
FIG. 17 is a block diagram showing the first example of the configuration of the image correction apparatus corresponding to a variation of the second embodiment of the present invention.
Figure 18:
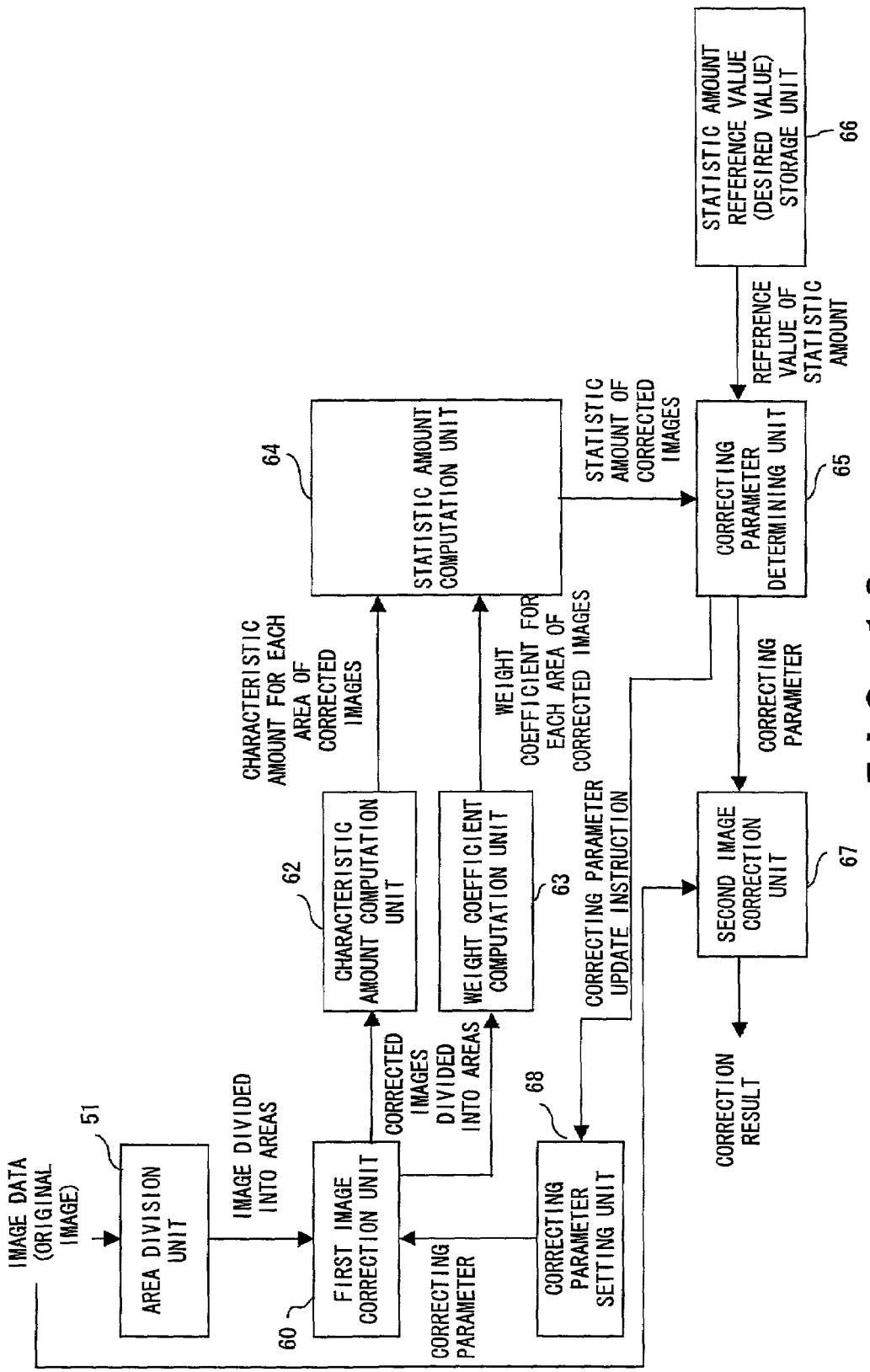
FIG. 18 is a block diagram showing the second example of the configuration of the image correction apparatus corresponding to a variation of the second embodiment of the present invention.
Figure 19:
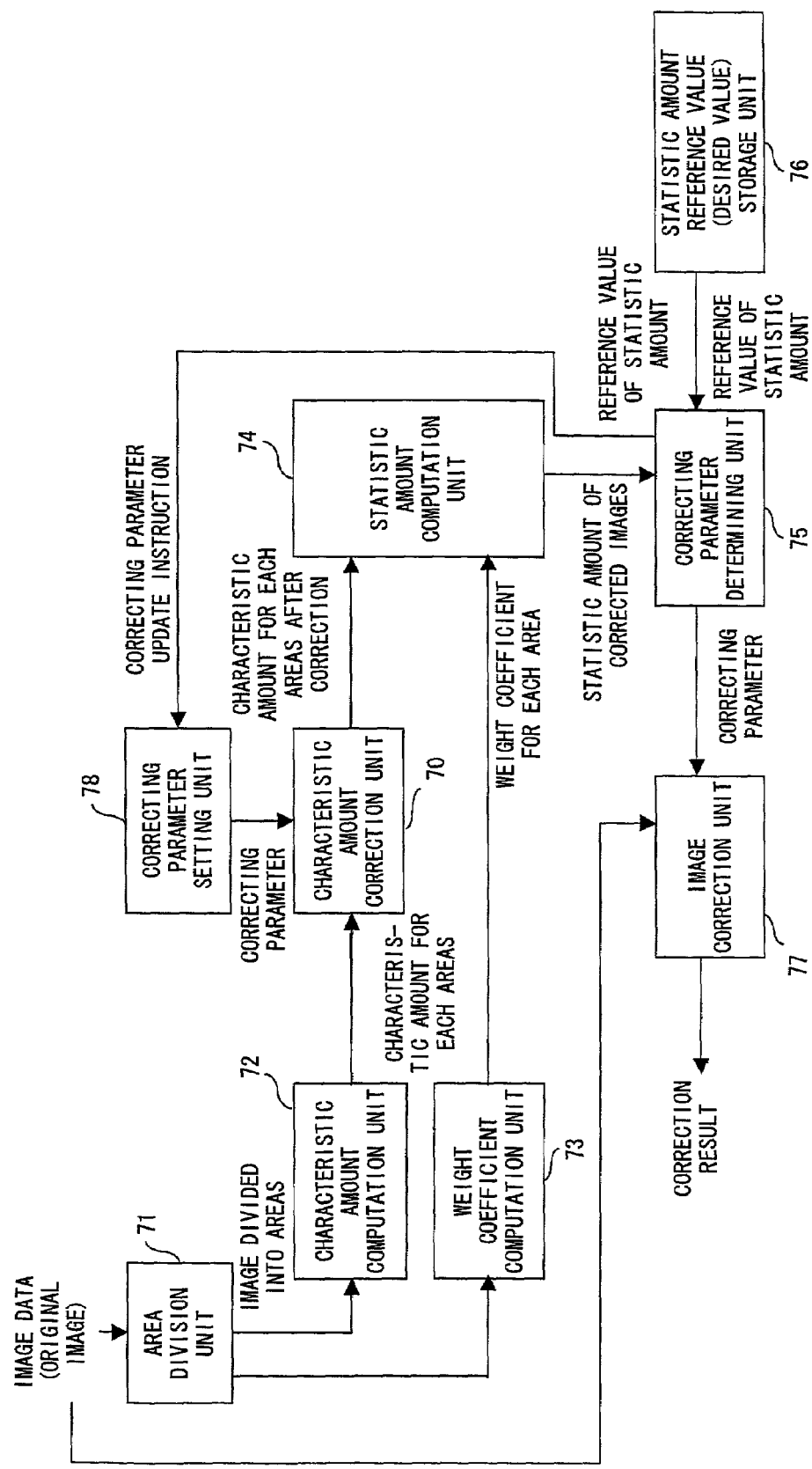
FIG. 19 is a block diagram showing the third example of the configuration of the image correction apparatus corresponding to a variation of the second embodiment of the present invention.

FIGS. 17 through 19 show examples of the configurations of the image correction apparatus corresponding to a variation of the second embodiment explained by referring to FIG. 12, etc.

In a variation of the second embodiment, a corrected image is sequentially generated with the correcting parameter changed, the process is terminated when a value of the statistic amount for a generated corrected image closest to a predetermined desired value can be obtained, and the image corrected using the correcting parameter is obtained as a correction result.

FIG. 17 shows an example of the configuration where a corrected image is generated and then it is divided into areas as the first example of the configuration of the image correction apparatus corresponding to a variation of the second embodiment.

In FIG. 17, a corrected image is first generated by a first image correction unit 50. At this time, a correcting parameter is set by a correcting parameter setting unit 58, and corresponds to, for example, the parameter seed k=−5 described by referring to FIG. 12.

The image corrected by the first image correction unit 50 is provided for an area division unit 51, and the area division unit 51 divides the image into areas. Then, a characteristic amount computation unit 52 and a weight coefficient computation unit 53 obtain the characteristic amount and the weight coefficient for each area. Using the obtained data, a statistic amount computation unit 54 computes the statistic amount for the corrected image.

A correcting parameter determination unit 55 determines whether or not the value of the statistic amount of the corrected image is closer to a predetermined desired value stored in a reference value storage unit 56 than the previously obtained value of the statistic amount. If not, then the correcting parameter determination unit 55 provides a correcting parameter update command for the correcting parameter setting unit 58, and repeats the corrected image generating process by the first image correction unit 50 using a new correcting parameter updated by the correcting parameter setting unit 58.

If the correcting parameter determination unit 55 determines that the statistic amount of the corrected image computed by the statistic amount computation unit 54 is closest to the predetermined desired value, then it outputs the correcting parameter of the corrected image for a second image correction unit 57. Then, the second image correction unit 57 corrects the original image using the correcting parameter, and outputs an image as a correction result.

FIG. 18 shows the second example of the configuration of the image correction apparatus corresponding to a variation of the second embodiment. With the second configuration, unlike the first configuration, an image is corrected after dividing it into areas.

In FIG. 18, as compared with the configuration shown in FIG. 17, a area division unit 61 first divides an original image into areas, a first image correction unit 60 generates a corrected image using the image divided into areas as with the configuration shown in FIG. 15. The processes by the first image correction unit 60 and the area division unit 61 are different from the processes shown in FIG. 17, and the operations of a characteristic amount computation unit 62, a weight coefficient computation unit 63, a statistic amount computation unit 64, a correcting parameter determination unit 65, a reference value storage unit 66, a second image correction unit 67, and a correcting parameter setting unit 68 are basically the same as those of the corresponding components shown in FIG. 17. Therefore, the explanation of these operations is omitted here.

FIG. 19 shows the third example of the configuration of the image correction apparatus corresponding to a variation of the second embodiment of the present invention.

In FIG. 19, an area division unit 71 first divides an original image into areas, a characteristic amount computation unit 72 obtains the characteristic amount for each area, a characteristic amount correction unit 70 corrects the characteristic amount using plural types of correcting parameters, and obtains the characteristic amounts of plural types of areas corresponding to each correcting parameter. Then, a statistic amount computation unit 74 computes the statistic amount of plural types of corrected images using the output of the characteristic amount computation unit 72 and a weight coefficient for each area obtained by weight coefficient computation unit 73.

The configuration shown in FIG. 19 is different from the configurations shown in FIGS. 17 and 18 up to the computation of the statistic amounts of plural types corrected images, but the processes performed by a correcting parameter setting unit 75, a statistic amount reference value storage unit 76, an image correction unit 77, and a correcting parameter setting unit 78 using the statistic amounts of the plural types of corrected images are the same as the processes with the first and second configuration examples described above.

The image correction apparatus described above can be realized by a common computer system.

FIG. 20 shows an example of the configuration of such a computer system. In FIG. 20, a computer 101 is configured by a body 102 and memory 103.

The memory 103 is a storage device such as random access memory (RAM), a hard disk, a magnetic disk, etc. Such memory 103 stores a program for performing the above mentioned processes shown in FIGS. 6 through 10, and 12, and the program is executed by the body 102, thereby estimating the status of an image and correcting the image according to the present invention.

The program can be transmitted from a program provider through a network 104, loaded into the computer 101, marketed, or stored in a portable storage medium 105. It can be executed by loading from the portable storage medium 105 to the computer 101.

The portable storage medium 105 can be various types of storage media such as CD-ROM, a floppy disk, an optical disk, a magneto-optic disk, etc. The above mentioned program is stored in such a storage medium, and the portable storage medium 105 can be set in the computer 101 to estimate the status of an image and correct the image according to the present invention.

In the above mentioned explanation, the status of an image is estimated by computing the characteristic amount for an original image and the image is corrected based on the estimation result by a correction device. However, the image status estimating method according to the present invention is not limited to an image correcting process, but can be used in selecting good images from among bad images based on an estimation result by an image selection device.

As described above, according to the present invention, the status of an image can be appropriately estimated for various images such as an image containing a large area having a specific tone level, an image inappropriate in the brightness of an intermediate tone level portion, an image containing a large number of small areas, an image in which the boundary of a systematically and automatically divided area does not match the boundary of an area recognized as important by a person, etc., and an appropriate correction can be made to the original image depending on the estimation result, thereby improving the practical use of various image processing devices.

What is claimed is:

1. An image lightness level estimating method for estimating a lightness level of an image, comprising:
   dividing an original image into a plurality of image sub-areas according to tone level information of pixels forming the image;
   computing, by a processor, an average lightness of the plurality of sub-areas producing lightness amounts;
   computing a statistic amount for estimation of the lightness level of a whole of the original image using the average lightness for each of the plurality of sub-areas; and
   correcting the original image using the statistic amount.

2. An image correcting method for correcting an original image, comprising:
   dividing an original image into a plurality of image sub-areas responsive to tone level information of pixels forming the image;
   computing, by a processor, an average lightness of the plurality of sub-areas producing characteristic amounts;
   computing a statistic amount for estimation of the lightness level of a whole of the original image using the average lightness for each of the plurality of sub-areas;
   comparing the statistic amount with a predetermined value;
   determining a correcting parameter based on the comparison result; and
   correcting the original image using the correcting parameter.

3. An image correcting method for correcting an original image, comprising:
   generating a plurality of corrected images by correcting the original image using a plurality of different correcting parameters;
   dividing the plurality of corrected images respectively into a plurality of image sub-areas responsive to tone level information of pixels forming the image;
   computing, by a processor, an average lightness for the plurality of sub-areas corresponding to the plurality of corrected images;
   computing an image statistic amount indicating a lightness level of a whole corrected image using the average lightness for the plurality of sub-areas for the plurality of corrected images; and
   defining a corrected image obtained using a correcting parameter corresponding to an image statistic amount closest to a predetermined value among the image statistic amounts as an appropriate corrected image.

4. An image correction apparatus which corrects an original image, comprising:
   an area division unit dividing the original image into a plurality of image sub-areas responsive to tone level information of pixels forming the image;
   an average lightness amount computation unit computing an average lightness for each of the plurality of sub-areas producing characteristic amounts;
   a statistic amount computation unit computing a statistic amount indicating a lightness level of a whole image using the average lightness of each of the plurality of sub-areas;
   a correcting parameter setting unit comparing the statistic amount with a predetermined value, and determining a correcting parameter based on a comparison result; and
   an image correction unit correcting the original image using the correcting parameter.

5. The apparatus according to claim 4, further comprising a weight coefficient computation unit computing a weight coefficient for each area, wherein said statistic amount computation unit computes the statistic amount using the average lightness for each area and the weight coefficient for each area.

6. An image correction apparatus which corrects an original image, comprising:
   a first image correction unit correcting the original image using a plurality of correcting parameters and generating a plurality of corrected images;
   an area division unit dividing each of the plurality of corrected images into a plurality of image sub-areas responsive to tone level information of pixels forming the image;
   an average lightness computation unit computing an average lightness for each of the plurality of sub-areas;
   a statistic amount computation unit computing a statistic amount indicating lightness value level of a whole image using the average lightness of each of the plurality of sub-areas; and
   a second image correction unit determining a corrected image obtained using the correcting parameter corresponding to the statistic amount closest to a predetermined value among the plurality of statistic amounts as a correction result.

7. A computer-readable storage medium storing a program used to direct a computer for estimating a tone level of an image to perform a process, comprising:
dividing an original image into a plurality of image sub-areas responsive to tone level information of pixels forming the image;
computing by a processor, an average lightness for each of the plurality of sub-areas;
computing a statistic amount for estimation of the lightness level of a whole of the original image using the average lightness for each of the plurality of sub-areas; and
correcting the original image using the statistic amount.

8. A computer-readable storage medium storing a program used to direct a computer for correcting an original image to perform a process, comprising:
dividing an original image into a plurality of sub-areas responsive to tone level information of pixels forming the image;
computing an average lightness for each of the plurality of sub-areas;
computing a statistic amount for estimation of the lightness level of a whole of the original image using the average lightness for each of the plurality of sub-areas;
comparing the statistic amount with a predetermined value;
determining a correcting parameter based on the comparison result; and
correcting the original image using the correcting parameter.

9. A computer-readable storage medium storing a program used to direct a computer for correcting an original image to perform a process, comprising:
generating a plurality of corrected images by correcting the original image using a plurality of different correcting parameters;
dividing the plurality of corrected images respectively into a plurality of sub-areas responsive to tone level information of pixels forming the image;
computing an average lightness for the plurality of sub-areas corresponding to the plurality of corrected images;
computing an image statistic amount indicating a lightness level of a corrected image using the average lightness for a plurality of corrected images; and
defining a corrected image obtained using a correcting parameter corresponding to an image statistic amount closest to a predetermined value among the image statistic amounts as an appropriate corrected image.

* * * * *

UNITED STATES PATENT AND TRADEMARK OFFICE
CERTIFICATE OF CORRECTION

PATENT NO. : 7,593,590 B2
APPLICATION NO. : 09/957032
DATED : September 22, 2009
INVENTOR(S) : Masayoshi Shimizu It is certified that error appears in the above-identified patent and that said Letters Patent is hereby corrected as shown below:

Column 20, Line 61, after "lightness" delete "value".

Column 21, Line 10, change "computing" to --computing,--.

Signed and Sealed this

Twenty-second Day of December, 2009

David J. Kappos
*Director of the United States Patent and Trademark Office*